(12) United States Patent
Mikic et al.

(10) Patent No.: US 11,780,572 B2
(45) Date of Patent: Oct. 10, 2023

(54) VTOL AIRCRAFT USING FIXED FORWARD CANTED ROTORS TO SIMULATE RIGID WING DYNAMICS

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 81 days.

(21) Appl. No.: 17/389,131

(22) Filed: Jul. 29, 2021

(65) Prior Publication Data

US 2022/0041271 A1 Feb. 10, 2022

Related U.S. Application Data

(63) Continuation of application No. 16/880,635, filed on May 21, 2020, which is a continuation-in-part of
(Continued)

(51) Int. Cl.
| | |
|---|---|
| *B64C 27/26* | (2006.01) |
| *B64C 3/32* | (2006.01) |
| *B64C 27/22* | (2006.01) |
| *B64C 29/00* | (2006.01) |
| *B64C 3/10* | (2006.01) |

(Continued)

(52) U.S. Cl.
CPC .............. *B64C 27/26* (2013.01); *B64C 3/10* (2013.01); *B64C 3/32* (2013.01); *B64C 27/08* (2013.01); *B64C 27/22* (2013.01); *B64C 27/52* (2013.01); *B64C 29/0016* (2013.01); *B64C 39/06* (2013.01); *B64C 39/068* (2013.01); *B64C 2027/8236* (2013.01)

(58) Field of Classification Search
CPC ....... B64C 3/32; B64C 27/26; B64C 29/0016; B64C 2027/8236
See application file for complete search history.

(56) References Cited

U.S. PATENT DOCUMENTS

| | | | |
|---|---|---|---|
| 3,856,238 A | * | 12/1974 | Malvestuto, Jr. ....... B64C 39/12 244/6 |
| 5,374,010 A | | 12/1994 | Stone et al. |

(Continued)

OTHER PUBLICATIONS

Larry A. Young, Conceptual Design Aspects of Three General Sub-Classes of Multi-Rotor Configurations: Distributed, Modular, and Heterogeneous; Jan. 20-22, 2015, Scottsdale, AZ.

(Continued)

*Primary Examiner* — Nicholas McFall
*Assistant Examiner* — Marisa V Conlon
(74) *Attorney, Agent, or Firm* — Michael A. Guth

(57) ABSTRACT

A method for the flying of a vertical take-off and landing aircraft which uses fixed rotors for both VTOL and forward flight operations. The rotors form a synthetic wing and are positioned to achieve a high span efficiency. The rotors are positioned to even out the lift across the span of the synthetic wing. The synthetic wing may also have narrow front and rear airfoils which may provide structural support as well as providing lift during forward flight, or may have a single center wing. The wing rotors are tilted forward and provide some forward propulsion during horizontal flight.

10 Claims, 33 Drawing Sheets

Related U.S. Application Data application No. 15/802,386, filed on Nov. 2, 2017, now Pat. No. 11,130,566.

(60) Provisional application No. 62/850,943, filed on May 21, 2019.

(51) Int. Cl.
| | |
|---|---|
| *B64C 27/08* | (2023.01) |
| *B64C 27/52* | (2006.01) |
| *B64C 39/06* | (2006.01) |
| *B64C 27/82* | (2006.01) |

(56) References Cited

U.S. PATENT DOCUMENTS

| | | | |
|---|---|---|---|
| 9,242,738 B2* | 1/2016 | Kroo | B64C 3/16 |
| 9,764,833 B1 | 9/2017 | Tighe et al. | |
| 9,944,386 B1* | 4/2018 | Reichert | B64C 25/54 |
| 10,053,213 B1* | 8/2018 | Tu | B64C 39/024 |
| 10,086,931 B2* | 10/2018 | Reichert | B64D 27/24 |
| 10,131,426 B2* | 11/2018 | Judas | B64C 39/08 |
| 10,364,024 B2* | 7/2019 | Tighe | B64C 27/26 |
| 10,577,091 B2* | 3/2020 | Parks | B64C 29/0025 |
| 2005/0178879 A1 | 8/2005 | Mao | |
| 2012/0091257 A1 | 4/2012 | Wolff et al. | |
| 2014/0097290 A1* | 4/2014 | Leng | B64C 11/46 244/6 |
| 2016/0144957 A1 | 5/2016 | Claridge et al. | |
| 2016/0207625 A1 | 7/2016 | Judas et al. | |
| 2016/0272312 A1 | 9/2016 | Mallard | |
| 2016/0347447 A1* | 12/2016 | Judas | B64C 29/0025 |
| 2018/0105279 A1 | 4/2018 | Tighe et al. | |
| 2018/0290736 A1* | 10/2018 | Mikic | B64C 27/22 |
| 2018/0305005 A1 | 10/2018 | Parks et al. | |
| 2019/0092461 A1 | 3/2019 | Duffy et al. | |
| 2019/0233077 A1* | 8/2019 | Tian | B64C 39/12 |
| 2019/0233107 A1 | 8/2019 | Tian | |
| 2019/0291626 A1 | 9/2019 | Duffy et al. | |
| 2020/0115045 A1 | 4/2020 | Mermoz et al. | |
| 2020/0164972 A1 | 5/2020 | Kiesewetter et al. | |
| 2020/0407055 A1 | 12/2020 | Mores et al. | |

OTHER PUBLICATIONS

PCT Search Report and Written Opinion; dated Oct. 28, 2020; for PCT/US2020/034055.

* cited by examiner

VTOL AIRCRAFT USING FIXED FORWARD CANTED ROTORS TO SIMULATE RIGID WING DYNAMICS

CROSS-REFERENCE TO RELATED APPLICATIONS

This application is a continuation of U.S. patent application Ser. No. 16/880,635 to Mikic et al, which claims priority to U.S. Provisional Patent Application No. 62/850,943 to Mikic, filed May 21, 2019, and which is a continuation-in-part of U.S. patent application Ser. No. 15/802,386 to Mikic et al., filed Nov. 2, 2017, and which claims priority to U.S. Provisional Patent Application No. 62/416,168 to Mikic et al., filed Nov. 2, 2016, all of which are hereby incorporated by reference in their entirety.

FIELD OF THE INVENTION

This invention relates to aerial vehicles, an aerial vehicle using rotors to simulate rigid wing aerodynamics.

SUMMARY

Figure 1A:
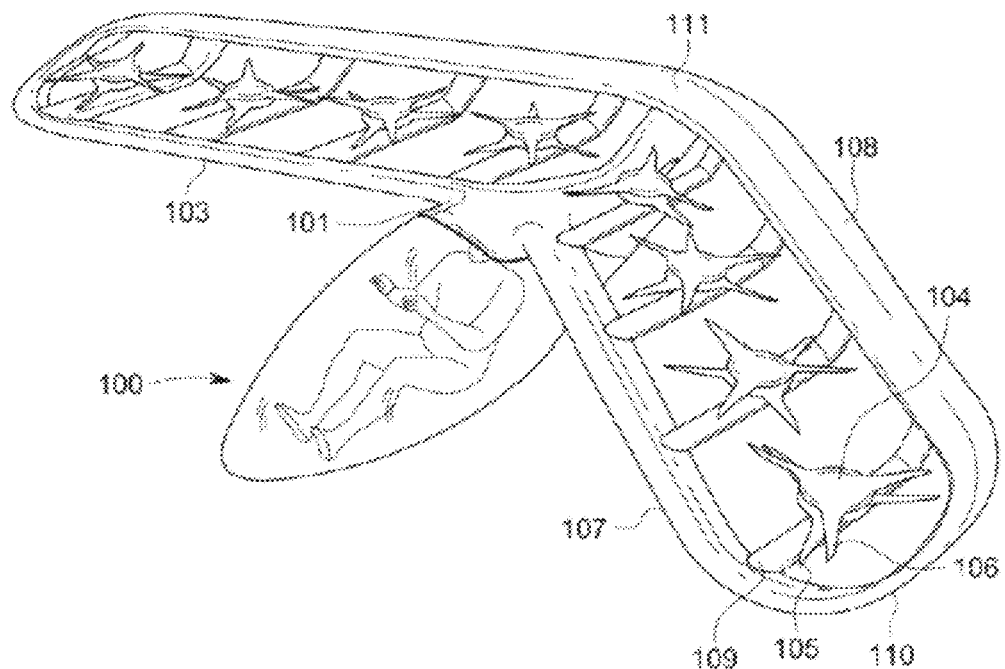
FIGS. 1A-D are shaded renderings of an aerial vehicle with synthetic wings using stacked counter-rotating propellers according to some embodiments of the present invention.
Figure 1B:
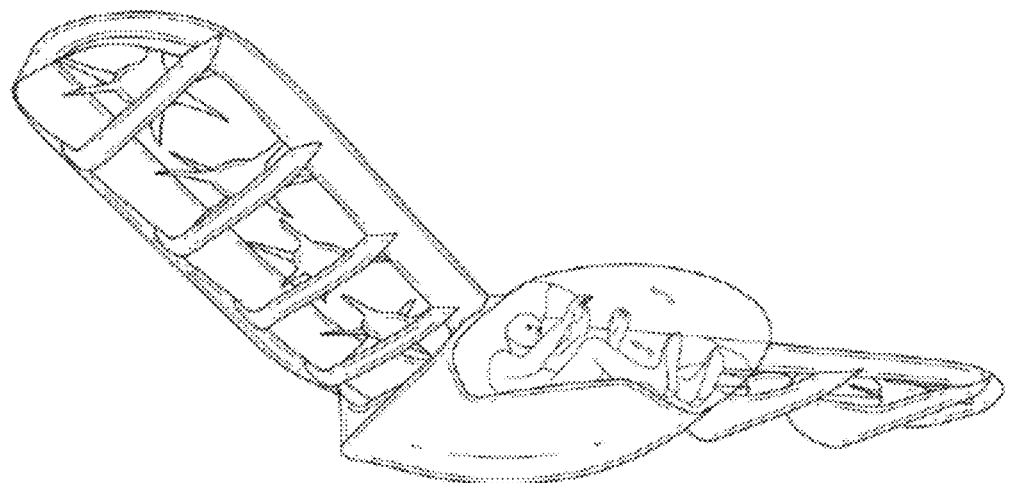
Figure 1C:
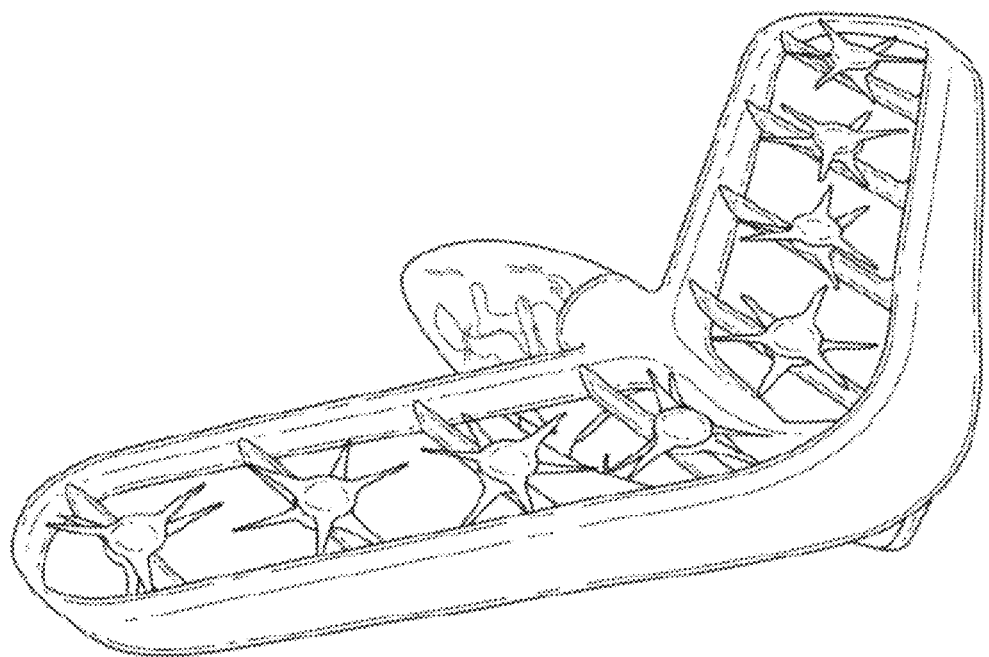
Figure 1D:
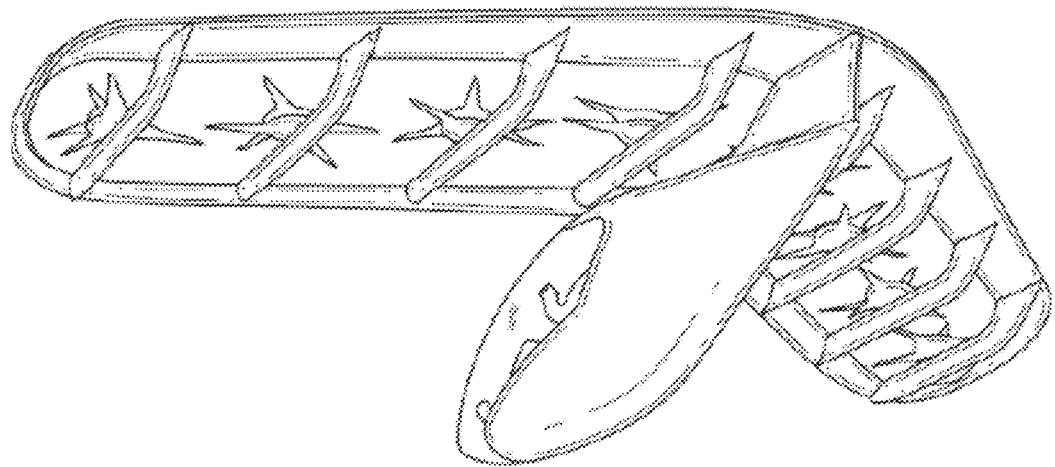
Figure 2A:
FIGS. 2A-D are drawings of an aerial vehicle with synthetic wings using stacked counter-rotating propellers according to some embodiments of the present invention.
Figure 2B:
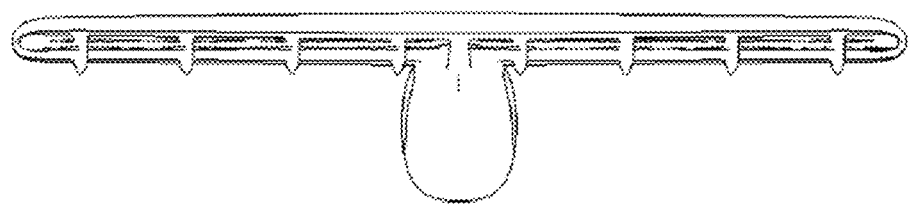
Figure 2C:
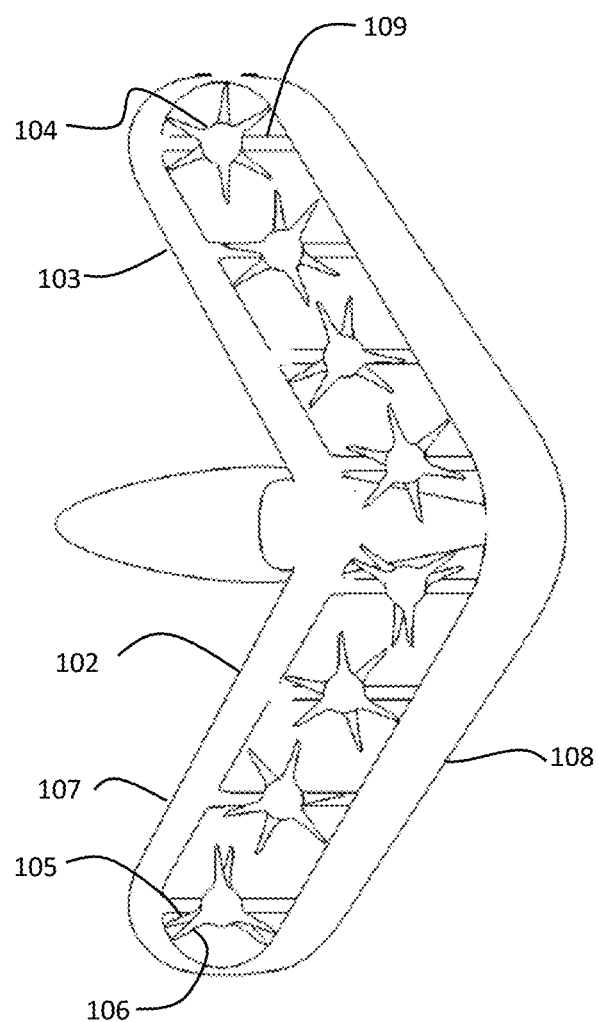
Figure 2D:
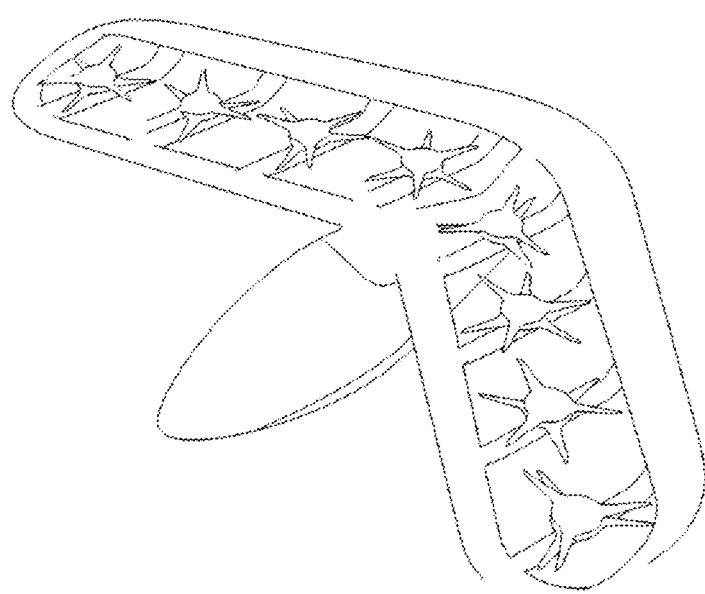

A vertical take-off and landing aircraft which uses fixed rotors for both VTOL and forward flight operations. The rotors form a synthetic wing and are positioned to achieve a high span efficiency. The rotors are positioned to even out the lift across the span of the synthetic wing. The wing rotors are tilted forward and provide some forward propulsion during horizontal flight. The wing rotors may be fixed in a forward tilted configuration.

DETAILED DESCRIPTION

In some embodiments of the present invention, an aerial vehicle which has an array of rotors configured to perform as a synthetic wing, or pseudo-wing. The rotors are positioned relative to the aerial vehicle body, and to each other, such that the lift of the rotor array has relatively even lift along the span of the pseudo-wing. The synthetic wing produces (relatively) even lift and relatively even trailing vertical velocity (downwash). Shed vorticity is concentrated at the wingtips, similar to a traditional airfoil wing.

In some embodiments, the rotors are fixedly mounted to structures coupled to the aerial vehicle main body. The rotors may be staggered along the longitudinal axis of the aerial vehicle such that differential thrusting along the longitudinal axis allows for forward pitch of vehicle in order to provide a forward thrust component from the rotors. In some aspects, pitch control may also be achieved using other means, such as elevator control. In some embodiments, the rotors may have some articulable aspects. In some aspects, the aircraft controls pitch, roll, and yaw by differentiating thrust of the rotors and without other control surfaces. In some aspects, the aircraft does not have other controllable surfaces for attitude control.

In some embodiments, the rotor arrays which make up the synthetic wing may have a short chord forward wing forward of the rotors. As the aerial vehicle uses the rotors for vertical thrust during take-off, the aerial vehicle does not need significant lift from traditional wings during take-off operations. A forward wing of short chord length allows for lift during forward flight, during higher airspeed operation. The aerial vehicle may also have a short rear wing rearward of the rotors. The rearward wing, with a short chord length, may provide lift during higher speed forward flight operations. The rearward wing may also further even out the downwash of the pseudo-wing. The forward wing and rearward wing may be used as structural elements which support struts that support the rotors. The forward wing and the rearward wing may join at the outboard ends, which may allow for increased strength and stability. Additionally, the forward wing and the rearward wing, which are in place around the outside (in the horizontal plane) of the arrays of rotors, provide an element of safety for users and ground personnel, as a shield around the spinning blades of the rotors.

In some embodiments, there may only be a trailing wing. In some embodiments, there may only be a leading edge wing. In some embodiments there are both a leading wing and a trailing wing. In some embodiments, there is a central wing which may have rotors forward and rearward of the central wing.

In some embodiments, one or more rotors are used to provide forward thrust. In some aspects, a single pusher rotor may be used at the rear of the aerial vehicle. In some embodiments, the rotation axis of the wing rotors may be tilted relative to vertical. In some embodiments, the wing rotors may be tilted forward. The forward tilted wing rotors contribute towards the forward thrust of the aerial vehicle during forward flight. In some embodiments, the total forward thrust during forward flight is derived from a combination of the forward tilted wing rotors and one or more traditional rotors with their spin axis parallel to the roll axis of the aerial vehicle.

The aerial vehicle may be constructed such that lift is provided by both the wings and the wing rotors in forward flight, and the forward propulsion is provided by a tail propeller and the forward tilted wing rotors.

The efficiency of the aircraft (lift/drag ratio) during forward flight may be sought to be as high as feasible while balancing other aircraft parameters. For example, the ratio of the tip speed of the spinning wing rotors during forward flight to velocity of the aircraft during forward flight is an important ratio to consider when designing for efficiency. Also, the percentage of lift provided by the wing rotors relative to the total lift (wings plus wing rotors) is an important ratio to consider when designing for efficiency. Also, the ratio of the power distribution between the wing rotors and the total power delivered to both the wing rotors and the traditional forward thrust propellers (a tail rotor, for example) is an important ratio to consider when designing for efficiency. The interplay between these ratios may be complex and does not lend itself to obvious optimization. An underlying design parameter is that the wing rotors provide sufficient vertical thrust during vertical take-off and landing to safely take-off and land the aircraft.

Aerial vehicles according to embodiments of the present invention are adapted for vertical take-off and landing using the wing rotors. For take-off the wing-rotors are spun up to a speed in the range of their hover rpm. In embodiments wherein the wing rotors have their spin axis tilted forward relative to the horizontal axis of the aerial vehicle, the aerial vehicle will be pitched up during take-off and landing such that the plane of the wing rotors is horizontal. After take-off the aerial vehicle may spin up a forward pushing (or pulling) propeller, such as a tail rotor, while the wing rotors are still under power. As the aerial vehicle gains forward speed, lift is generated by the leading wings and the trailing wings, or in other embodiments lift is generated by a central wing, and the proportion of lift provided by the wing rotors decreases. As the aircraft approaches its cruise velocity, the wing rotors typically have their rpms reduced, but they stay under power and provide a portion of the total lift of the aerial vehicle. In some aspects, the wing rotors may be reduced in power such that they provide negligible lift, but are spinning and able to be quickly spun up to provide attitude control of the aircraft.

An aerial vehicle according to embodiments of the present invention will be able to engage in hover, take-off, landing, and forward flight including all required maneuvering and attitude adjustments by manipulating the speeds of individual rotors, and without the need for any further control surfaces. In some embodiments, the aerial vehicle will not have ailerons, or elevators, or any other controllable control surfaces. In such a circumstance, with fixed tilt rotors being used for attitude control, the total simplicity of the design and system provides significant advantages. In some embodiments, the wing rotors for each wing are arranged along a linear line, or along a curving line, with each rotor further out from the aircraft body. The wing rotors may also be in a forward or rearward swept configuration such that the rotors are at different stations along the roll axis of the aircraft. In other embodiments, there are forward and rearward rotors which are forward and rearward, respectively, of the wing and of the aircraft center of mass. With the differential stations along the roll axis, the wing rotors are then able to provide control around the pitch axis. With spacing at distances further out from the aircraft body, the wing rotors are able to provide control around the roll axis.

In some aspects, some of the rotors on each side of the aircraft may spin in a first direction, while others spin in the opposite direction. In such a circumstance, yaw may be controlled by altering the speeds and/or torques of the rotors spinning in the first direction relative to those spinning in the opposite direction. In some aspects, rotors on each side of the aircraft body may be set at slightly different forward tilt angles. In such a circumstance, yaw control may be achieved by altering the relative speed and/or thrust of the different rotors and slightly different tilt angles.

In some embodiments, as seen in FIGS. 1A-D in shaded renderings and in FIGS. 2A-D in line drawings, an aerial vehicle 100 has a main body 101 coupled to a right synthetic wing 102 and a left synthetic wing 103, using stacked counter-rotating propellers. In this exemplary embodiment, with a short chord leading wing 107 and a short chord trailing wing 108, a plurality of rotor assemblies 104 are located along a span length. The rotor assemblies 104 are mounted on span supports 109 which are coupled to the leading wing 107 and the trailing wing 108. A wing tip section 110 joins the leading wing 107 to the trailing wing 108.

The rotor assemblies 104 may have a first propeller 105 and a second propeller 106. In some aspects, the first propeller 105 and the second propeller 106 spin in opposite directions. In such a configuration, the leading edge of one propeller goes forward on the outboard side of the spin axis of the rotor, and the leading edge of the other propeller goes forward on the inboard side of the spin axis of the propeller. In a forward flight mode, a propeller blade will have a higher thrust as it is coming forward into the prevailing airspeed wind than it will when retreating relative to the prevailing airspeed wind. With counter rotating coaxial propellers, the downward thrust inboard and outboard of the rotor axis is evened out.

In an exemplary embodiment, an aerial vehicle may accommodate one passenger and have a take off mass of 315 kg. The span of the wings may be 6 m, and the length of the vehicle may be 3.5 m, with a height of 1.5 meters. The pseudo wings may each be of 4 coaxial rotor assemblies, each with a pair of counter-rotating propellers. Each propeller has 3 blades, with a blade chord at 75% radius of 0.05 m. The aerial vehicle has a short chord front wing with a chord of 0.5 m mean, and a short chord rear wing with a chord of 0.75 m mean. The idealized cruise speed is 100 knots with a top cruise speed of 150 knots. The power consumption in ideal cruise is 20 kW, and the power consumption in hover mode is 80 kW. The battery mass is 50 kg and the range of the vehicle is 50 miles.

An aspect of the synthetic wing is that the rotors are configured to provide relatively even thrust along span of the synthetic wing. One approach is as discussed above, with counter-rotating propellers on rotor assemblies places adjacent to each other along the span of the pseudo-wing. Another approach, which does not use coaxial counter-rotating propellers, is to have propellers which have overlapping retreating and forward going blade areas. For example, a rotor may be placed with a forward moving blade on the outboard side, retreating on the inboard side. Just inboard from this rotor may be another rotor with its forward moving blade on the outboard side. The rotors may be spaced vertically to allow this overlap. In some aspects, the rotors may be spaced along the longitudinal axis to allow this overlap.

Figure 3:
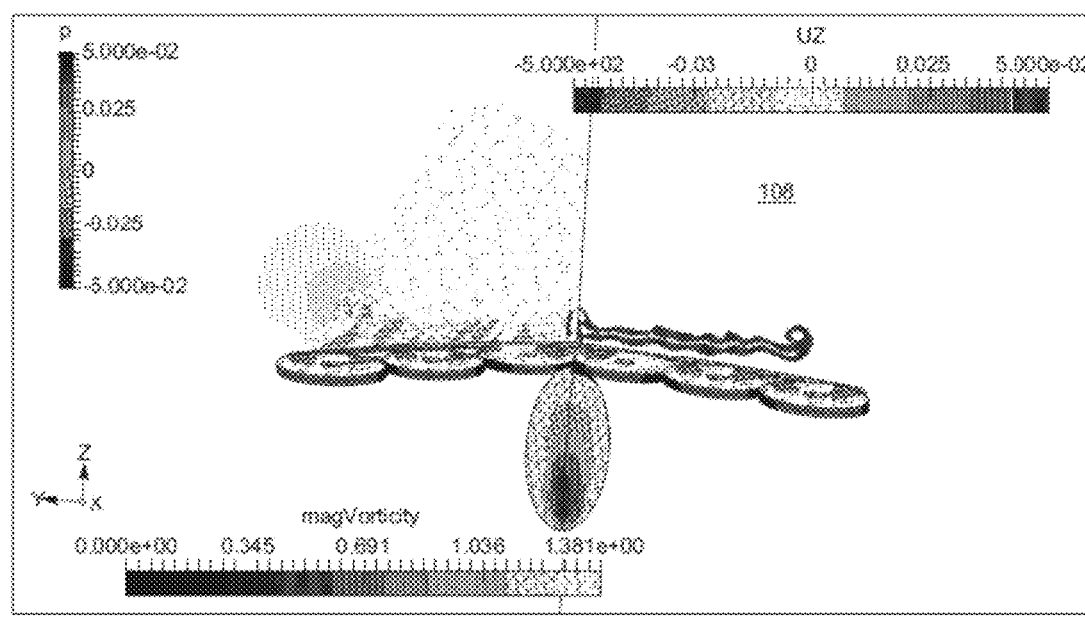
FIG. 3 is a solution plot of an aerial vehicle in forward flight according to some embodiments of the present invention.

FIG. 3 illustrates functional aspects of a synthetic wing, using as an exemplary embodiment an aerial vehicle with three counter rotating rotor assemblies on each side of the vehicle main body. The left hand side of the figure illustrates the vertical velocity behind the wing, and the right hand side of the figure represents the magnitude of vorticity. A goal of the design of the synthetic wing is the reduced variation of the lift across the span of the synthetic wing. The reduced variation of the lift along the span of the wing may become apparent by modeling for the vertical velocity behind the wing. The left hand side of the figure illustrates relatively steady amount of vertical velocity along the span, demonstrating that the synthetic wing using three counter-rotating rotor assemblies functions, in the aerodynamic sense, as a regular wing constructed using a solid airfoil shape.

The right hand side of the figure illustrates the magnitude of vorticity along the span of the wing and at its tip. The evenness of the vertical velocity along the span, as discussed above, should, as a first approximation, indicate commensurate evenness of the magnitude of vorticity. When using rotors arrayed into a synthetic wing there is a real possibility of introducing spots of high vorticity along the span. The location of the rotors is very important to minimize the magnitude of shed vorticity along the span.

Although the results seen in FIG. 3 represent output for a modeled synthetic wing, it is understood that there is certain amount of time dependent variation in the outputs related to the variation in blade position in time.

Figure 4A:
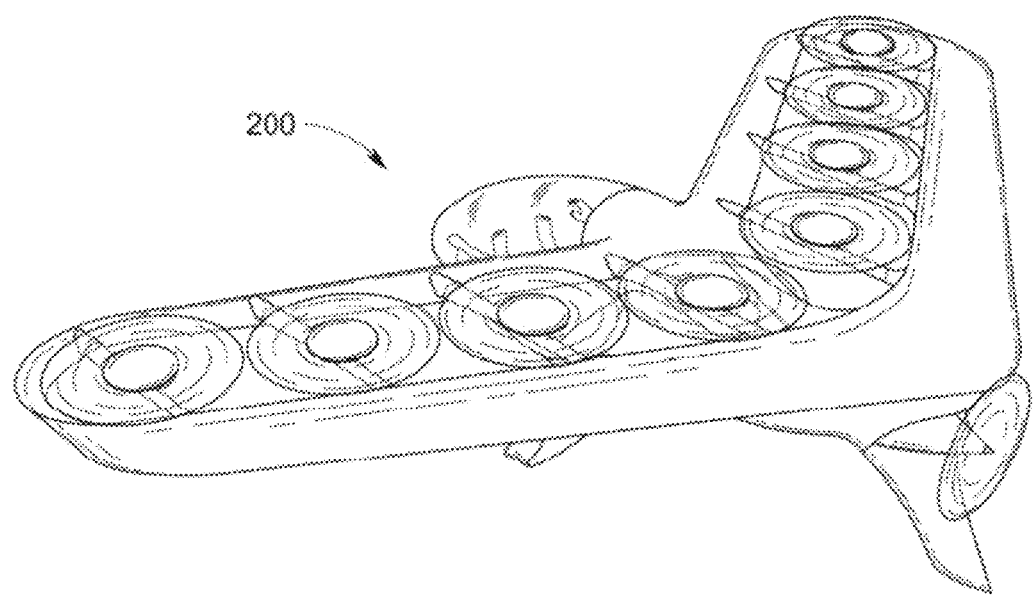
FIGS. 4A-B are shaded renderings of an aerial vehicle with synthetic wings according to some embodiments of the present invention.
Figure 4B:
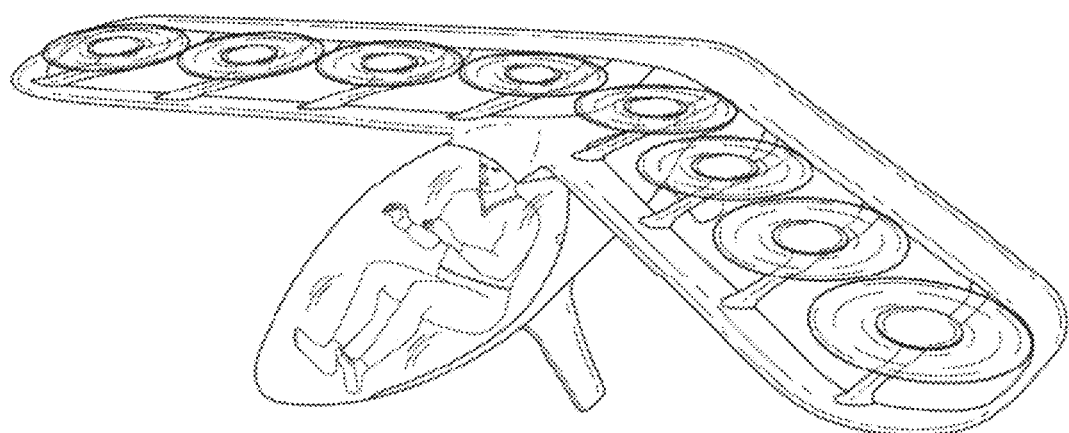
Figure 5A:
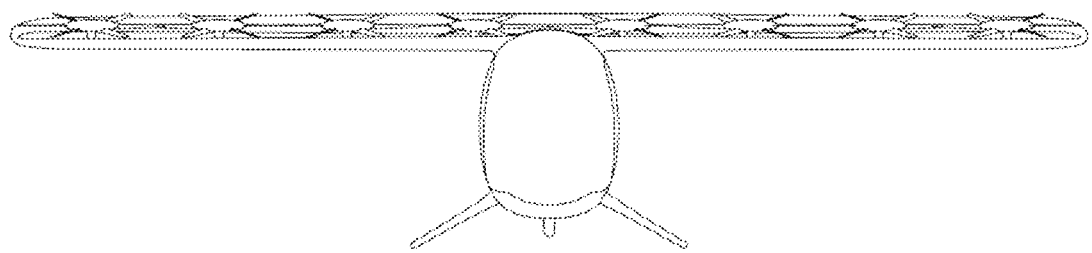
FIGS. 5A-C are drawings of an aerial vehicle with synthetic wings according to some embodiments of the present invention.
Figure 5B:
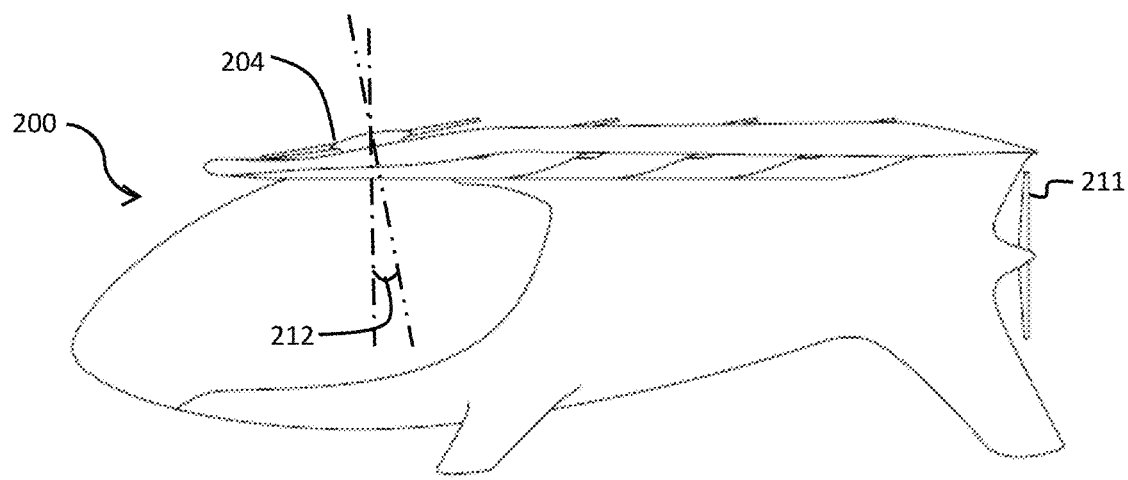
Figure 5C:
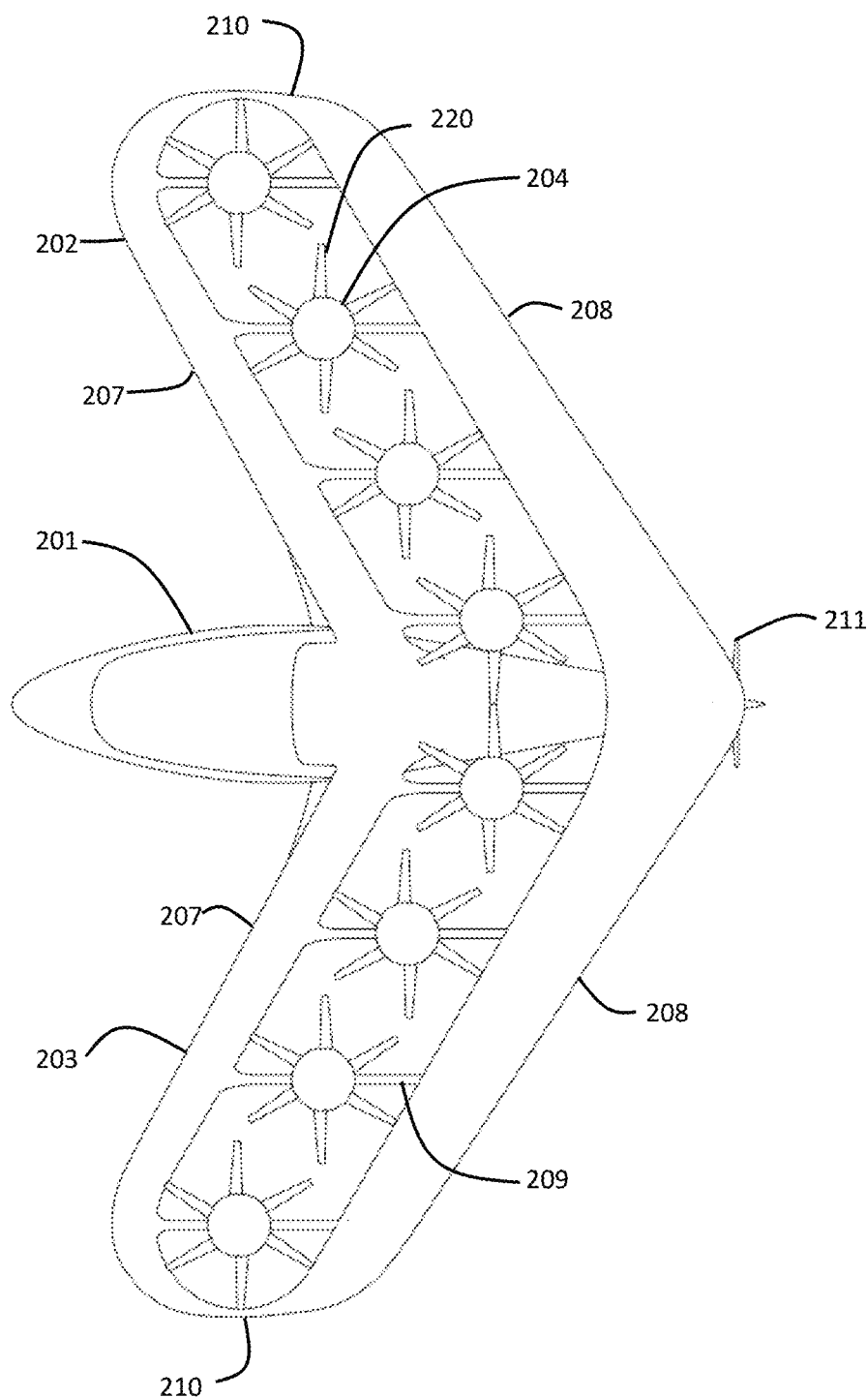

In some embodiments, as seen in FIGS. 4A-B in shaded renderings and in FIGS. 5A-C in line drawings, an aerial vehicle 200 has a main body 201 coupled to a right synthetic wing 202 and a left synthetic wing 203, using wing mounted rotors. In this exemplary embodiment, with a short chord leading wing 207 and a short chord trailing wing 208, a plurality of wing rotor assemblies 204 are located along a span length. The wing rotor assemblies 204 are mounted on span supports 209 which are coupled to the leading wing 207 and the trailing wing 208. A wing tip section 210 joins the leading wing 207 to the trailing wing 208. The aerial vehicle 200 does not use counter-rotating, stacked, rotor assemblies. Although stacked assemblies may have distinct advantages with regard to load distribution, in some embodiments wherein the lift percentage delivered by the rotors during horizontal flight is lower, efficient flight may be achieved with single rotors, such as with the aerial vehicle 200. Further, single rotors allow for reduced cost and complexity.

In some aspects, the wing rotor assemblies 204 are not vertical relative to the constant altitude cruise plane of the aircraft, but are tilted forward at an angle 212. In some aspects, the rotors are tilted forward in the range of 5-20 degrees. In some aspects, the rotors are tilted forward in the range of 5-15 degrees. In some aspects, the rotors are tilted forward in the range of 8-20 degrees. In some aspects, the rotors are tilted forward in the range of 8-12 degrees. In an exemplary embodiment, the rotors are tilted at 10 degrees. The tilt angle may be defined as the angle between the rotor axis and the mean aerodynamic chord line of the largest wing, which may be the trailing wing in some embodiments.

Figure 10A:
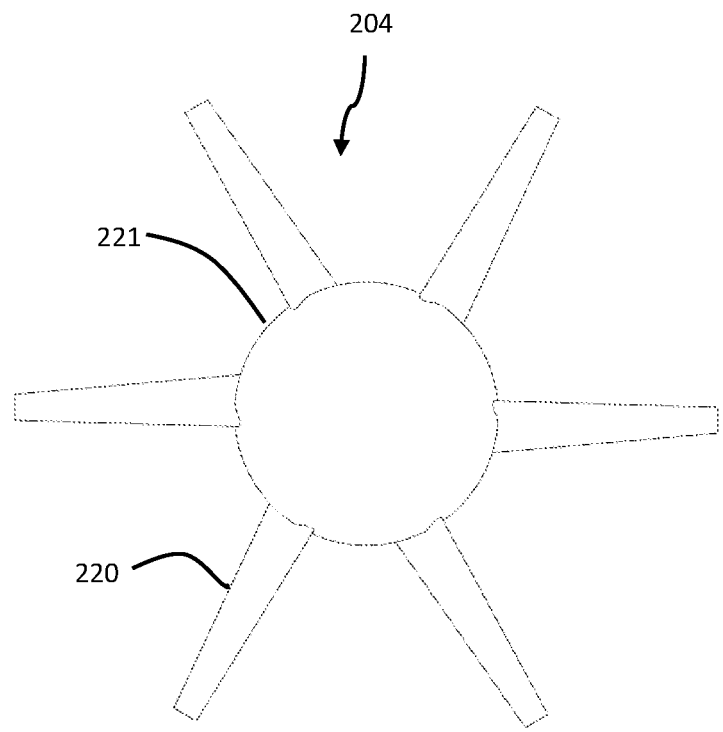
FIGS. 10A-B are views of a rotor according to some embodiments of the present invention.
Figure 10B:

The aerial vehicle 200 has a horizontal thrusting rear rotor assembly 211 adapted to provide horizontal thrust during regular flight. Size and configuration details of an exemplary embodiment of the aerial vehicle 200 are seen in Table 1. FIGS. 10A-B illustrate a rotor 204 with its central hub 221, which may include an electric motor, and the blades 220. The central hub 221 may have an electric motor within it, and may have an exterior surface adapted for low drag when in a forward flight configuration.

In some aspects, the wing rotor assemblies 204 have rotating propellers with electric motors. In some aspects, the horizontal thrusting rear rotor assembly 211 has an electric motor. In some aspects, the motors are powered by an electric power source, such as a battery or plurality of batteries.

TABLE 1

| General dimensions | |
|---|---|
| Maximum take off mass [kg] | 500 |
| Number of occupants | 1 |
| Payload [kg] | 100 |
| Battery mass [kg] | 150 |
| Wing span [m] | 5.8 |
| Length [m] | 3.6 |
| Height [m] | 1.5 |
| Total wing area [m^2] | 4.2 |
| Front wing mean chord [m] | 0.25 |
| Rear wing mean chord [m] | 0.375 |
| Wing sweep [deg] | −30 |
| Performance | |
| Cruise speed [kts] | 100 |
| Total cruise power [kW] | 32 |
| Lift/Effective drag | 8 |
| Range [nm] | 50 |
| Rotors | |
| Number of synthetic wing rotors | 8 |
| Number of blades per rotor | 6 |
| Rotor diameter [m] | 0.8 |
| Disk loading [kg/m^2] | 124 |
| Inner rotor radius [m] | 0.15 |
| Blade root chord [cm] | 6 |
| Blate tip chord [cm] | 3 |
| Blade root pitch [deg] | 13 |
| Blade tip pitch [deg] | 10 |
| Installed tilt angle in cruise [deg] | 10 |
| Tail propeller diameter [m] | 0.6 |
| Electric motor for rotors | |
| Peak power [kW] | 50 |
| Continuous power [kW] | 25 |
| Power in hover (sea level) [kW] | 20 |
| Power in cruise [kW] | 2 |
| Power in cruise (total rotors) [kW] | 16 |
| Cruise RPM | 1200 |
| Hover RPM | 3400 |
| Electric motor for propeller | |
| Continuous power [kW] | 20 |
| Cruise RPM | 1200 |
| Power in Cruise [kW] | 16 |

The use of wing rotor assemblies which are tilted forward allows for forward propulsion to be provided in part by the wing rotor assemblies and in part by the regular, horizontal thrusting, propeller. A factor to be considered in the sharing of this forward propulsion is the fraction of the total power delivered to the wing rotors relative to the total power delivered to both the wing rotors and the regular propeller during forward cruise flight.

Another factor to be considered is the fraction of lift carried by the wing rotors relative to the total lift provided by both the wing(s) and wing rotors during forward flight. In an embodiment wherein all attitude control, including roll control, is induced or maintained by manipulation of wing rotor motor speeds, the fraction of lift provided by the wing rotors must be high enough to allow the manipulation of the wing rotors to be effective in controlling the aircraft attitude. In some aspects, the fraction of the lift provided by the wing rotors at cruise speed is greater than 0.2. In some aspects, the fraction of the lift provided by the wing rotors is greater than 0.25. In some aspects, the fraction of the lift provided by the wing rotors is greater than 0.3. In some aspects, the fraction of the lift provided by the wing rotors is greater than 0.1. The fraction of lift provided represents to total of all of the wing rotors in nominal forward flight relative to the wing, but in some aspects certain rotors may be spun down to a lower speed in support of aerodynamic control of the aircraft. In some aspects, one or more rotors may temporarily produce negative lift in support of certain control operations.

Another factor to be considered is the ratio of the tip speed of the wing rotors relative to the velocity of the aircraft during forward flight. This factor may come into play as one or more wing rotors is lowered in speed to reduce lift on one of the wings to effect roll. In such a maneuver, the wing rotors on the other wing may be spun up to increase lift. A risk of stall occurs on the retreating rotor blades when run nominally at a low multiple of aircraft velocity. In some aspects, the nominal cruise wing rotor tip velocity is greater than 2.0 times the aircraft cruise speed. In some aspects, the nominal cruise wing rotor tip velocity is greater than 2.5 times the aircraft cruise speed. In some aspects, the nominal cruise wing rotor tip velocity is greater than 1.5 times the aircraft cruise speed. In some aspects, the nominal cruise wing rotor tip velocity is greater than 1.0 times the aircraft cruise speed. In some aspects, the nominal cruise wing rotor tip velocity may be as low as greater than 0.5 times the aircraft cruise speed. The tip velocity is understood to be the angular velocity of the blades times their radial length.

Figure 6A:
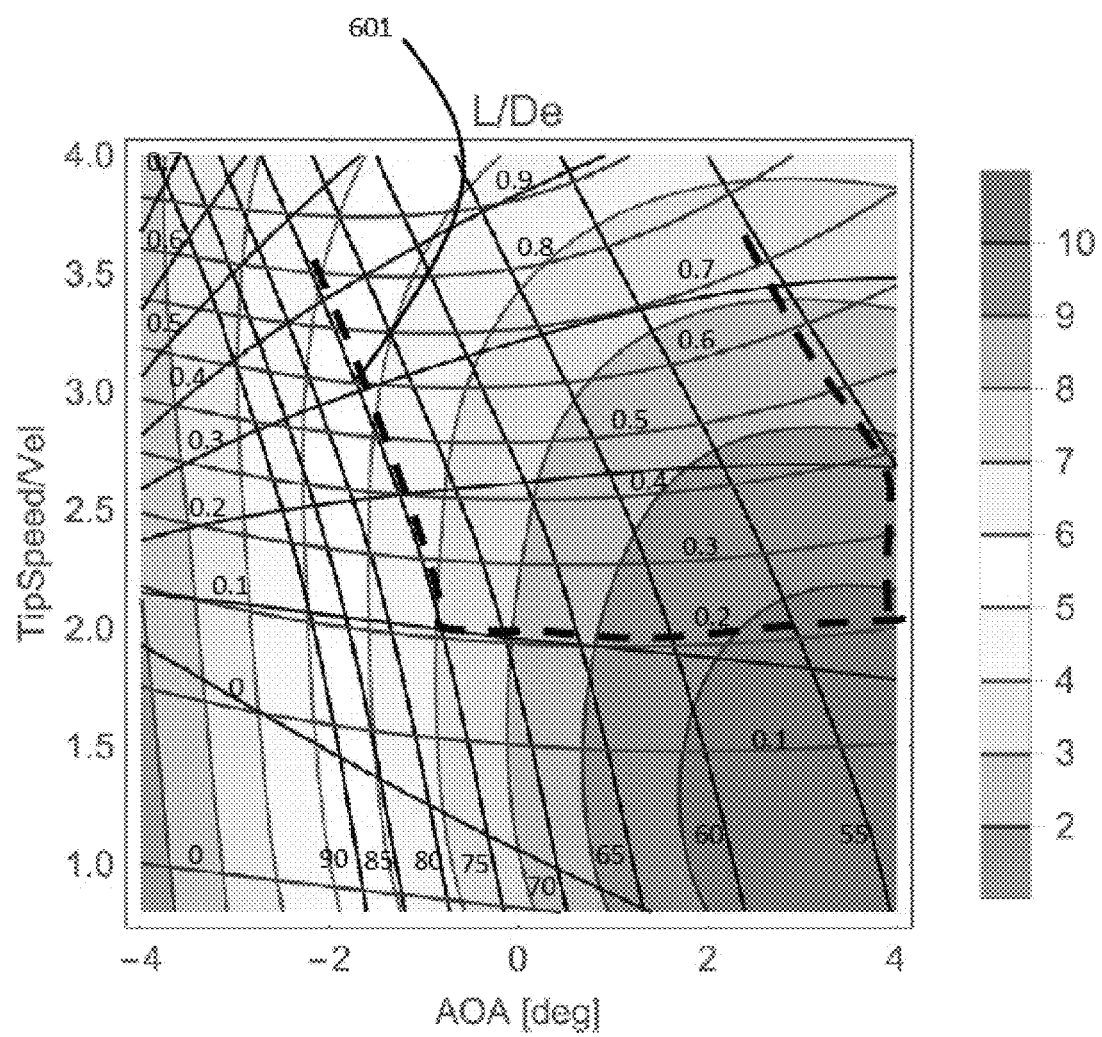
FIGS. 6A-G are lift drag curves for a variety of parameter values.

The factors discussed above have been modeled to determine the lift to drag ratio L/De (effective drag) for the aerial vehicle 200 as a function of the tip speed of the wing versus the aircraft forward speed against the angle of attack of the aircraft, and this data has been graphically represented. The lift to drag ratio can be seen as color coding signifying the lift to drag ratio. The lift to drag ratio (effective drag) is the combined shaft power of the aircraft divided by the aircraft forward velocity. Laid over this color coding are contour lines signifying the other factors discussed above; the fraction of total power delivered (red lines) to the wing rotors, the fraction of lift carried by the wing rotors (blue lines), and also the aircraft velocity (black lines). The lift to drag ratio is modeled at different forward tilt angles for the wing rotors, and also with different wing rotor blade pitches. As seen in FIG. 6A, by bracketing in the portion of the graph between the cruise speed range of the aircraft 200 (50-75 m/s), and by reviewing the area with a wing rotor tip speed to aircraft speed ratio over 2.0, it has been discovered that a non-obvious range of parameters give operational modes with the highest lift to drag ratio. The wing rotor tip speed to aircraft speed ratio of 2.0 lines up well with the line for the ration of 0.1 lift ratio of lift carried by the wing rotors over total lift of rotors and wings, a lift ration at which the wing rotors will provide lift of an amount that will allow for sufficient aircraft attitude control. A preferred outcome is to have the lift to drag ratio above 8 within constraint values discussed above, with higher ratios of 9 or 10 even more desirable. As seen in FIG. 6A, the aircraft analyzed at 10 degrees forward tilt of the rotors is able to operate at a tip speed ratio above 2, at a lift ratio above 0.1 (or higher), over a range of aircraft speeds, with a L/De ratio over 8 at a variety of aircraft speeds.

FIGS. 6A-G are CFD results weighing the parameters discussed above for differing versions of an aerial vehicle. FIG. 6A illustrates the results for the aerial vehicle 200 discussed above. The outline 601 forms a bound around an area bounded by the cruise speeds 50 m/s and 75 m/s, and above the rotor tip speed vs. aircraft speed ratio above 2.0. As seen, there are significant areas of L/De which are above 8, including significant areas above 9, and some above 10. This signifies that this vehicle, with 10 degree forward tilted wing mounted rotors, can achieve these L/De ratios over a variety of operating scenarios.

Figure 6B:
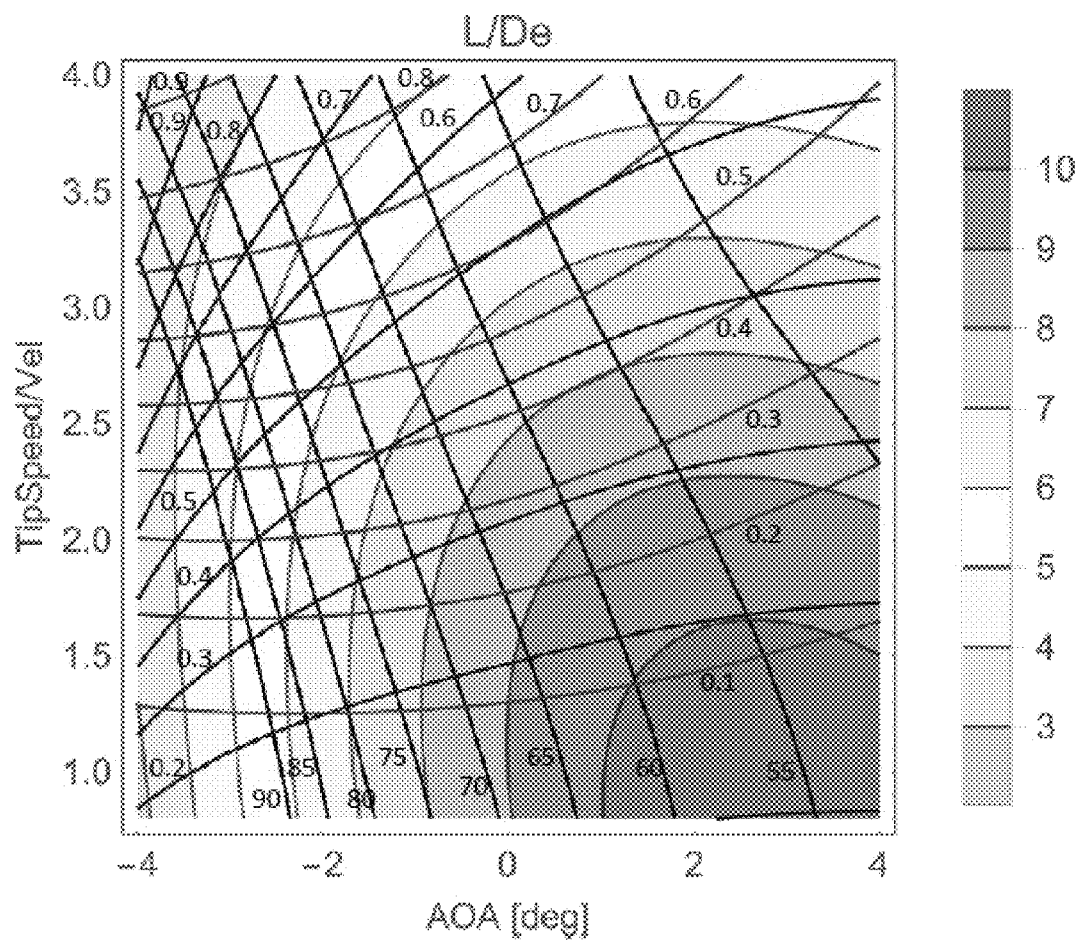

FIG. 6B illustrates a similar vehicle with the rotors at 0 degrees of forward tilt. As seen, there are almost no areas of L/De of as high as 9 above the 2.0 speed ratio line.

Figure 6C:
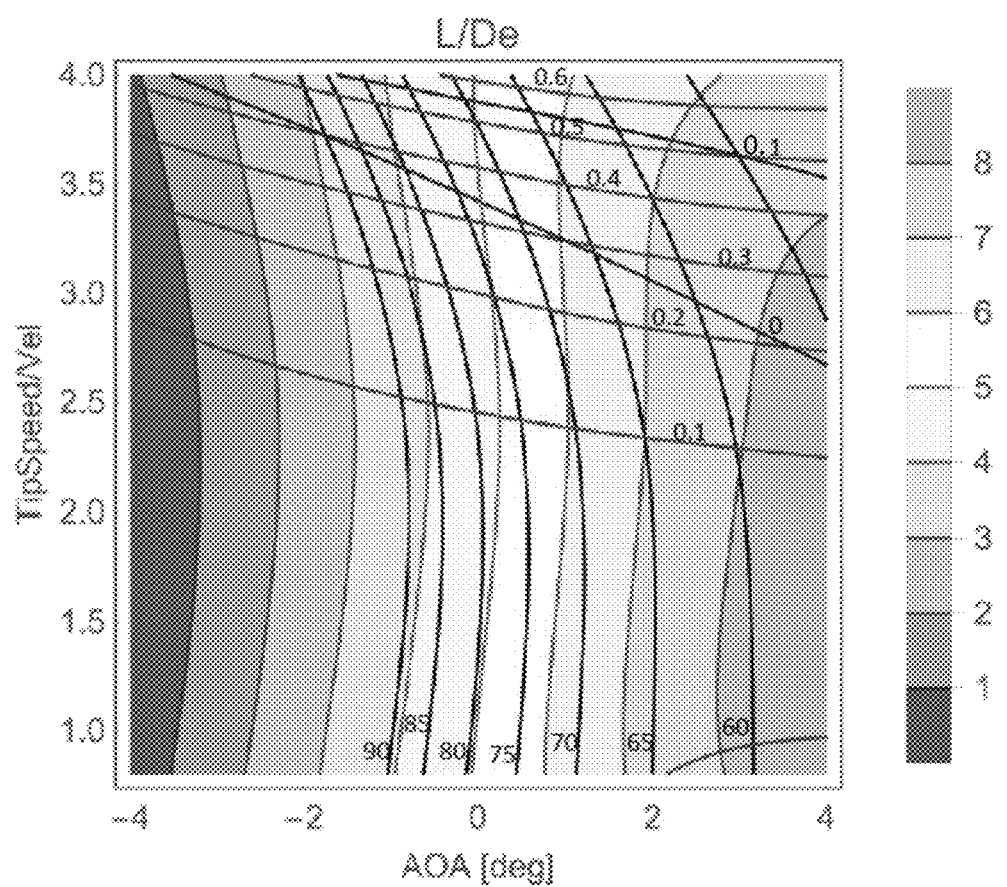

FIG. 6C illustrates a similar vehicle with the rotors at 20 degrees of tilt. As seen, there are no areas of L/De higher than 8 available to operate within. By contrasting the L/De as seen in FIGS. 6B and 6C, which are 0 degrees and 20 degrees forward tilt, respectively, one can see the advantages of the 10 degree tilt, for example. Within the outlined area 601 other design tradeoffs are made in order to reach an optimized design based upon flight usage considerations.

Figure 6D:
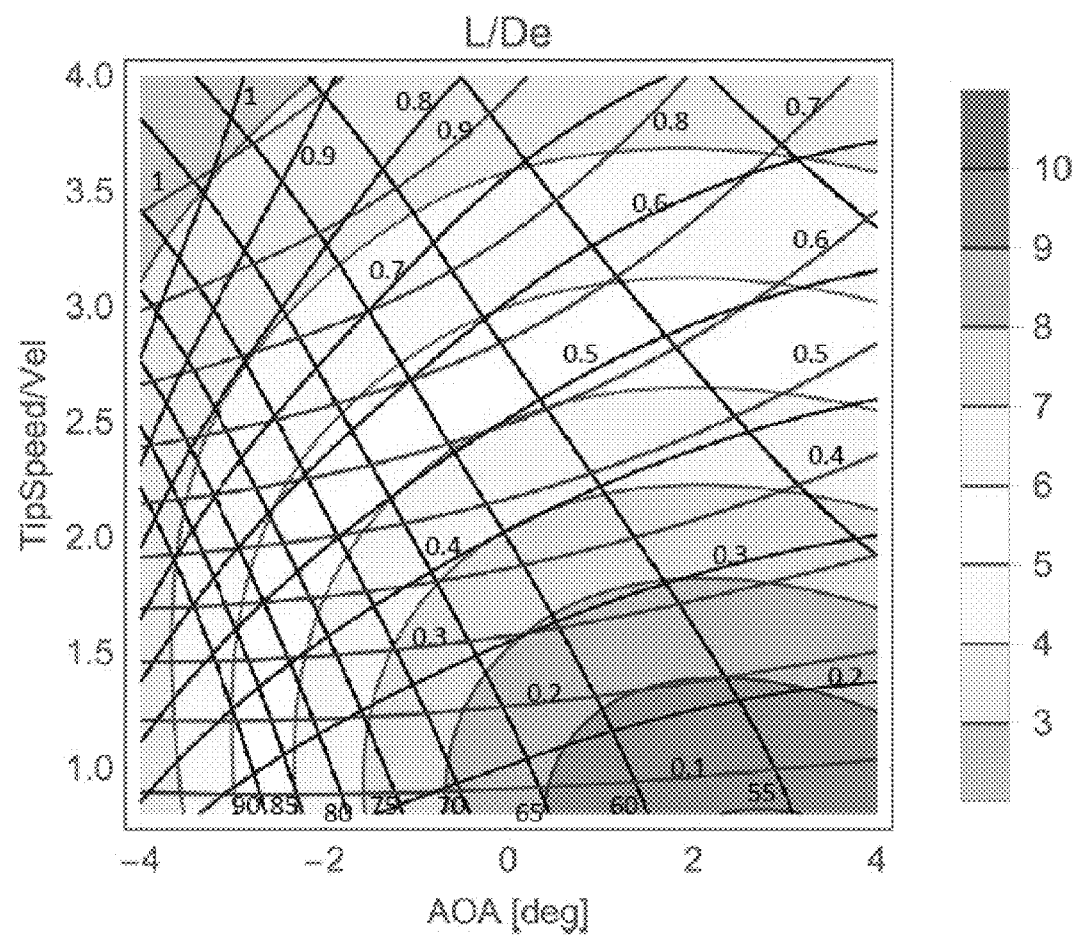

FIG. 6D illustrates a similar vehicle with the rotors at 0 degrees of forward tilt but with rotor blades with 5 degrees more pitch than the case of FIG. 6B. As seen, there are almost no areas of L/De of as high as 8 above the 2.0 speed ratio line.

Figure 6E:
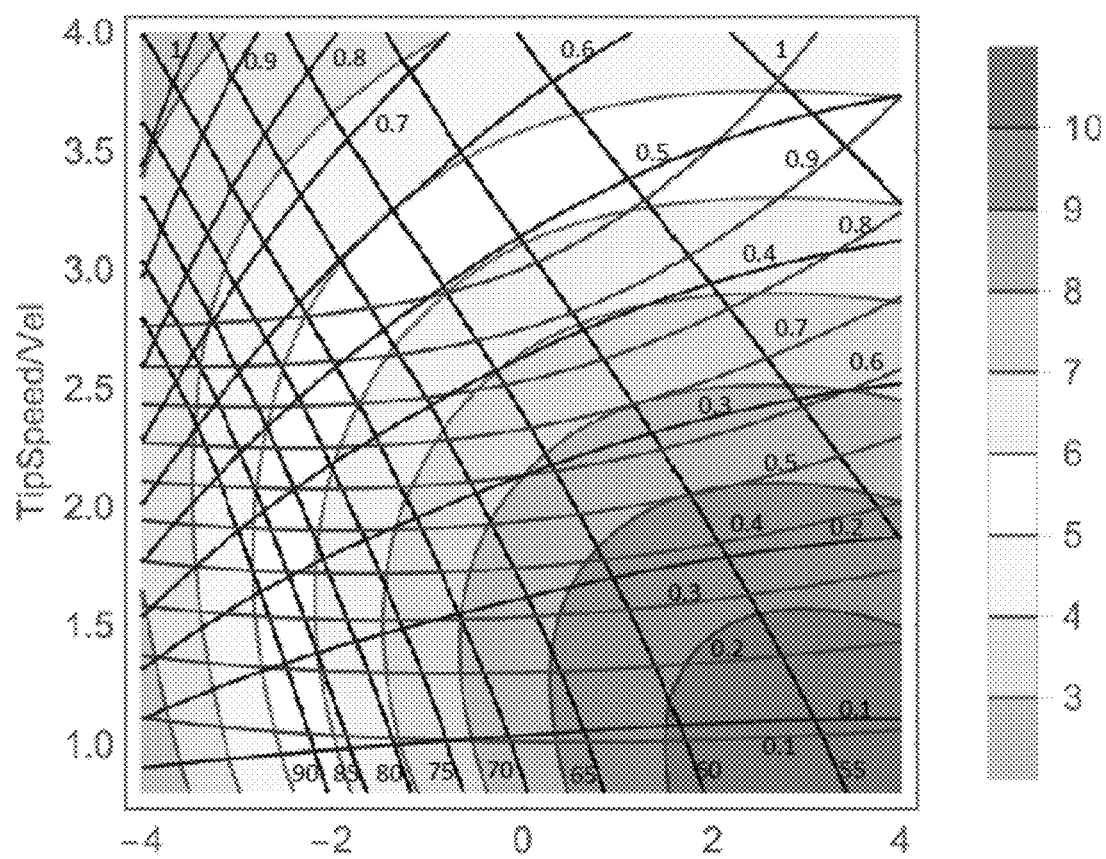

FIG. 6E illustrates a similar vehicle with the rotors at 10 degrees of forward tilt but with rotor blades with 5 degrees more pitch than the case of FIG. 6A. As seen, there are almost no areas of L/De of as high as 8 above the 2.0 speed ratio line, although relative to the other cases with 5 degrees more pitch in the rotor blades this appears to be optimal.

Figure 6F:
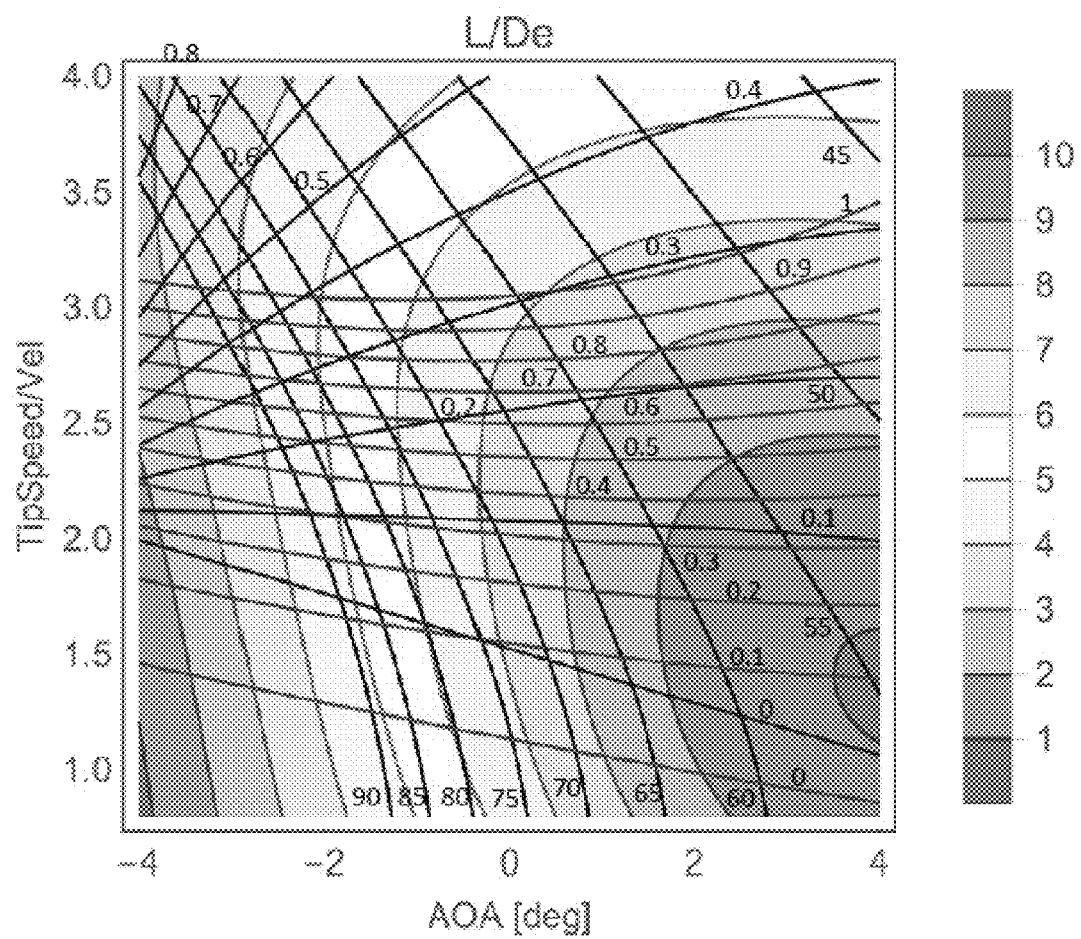
Figure 6G:
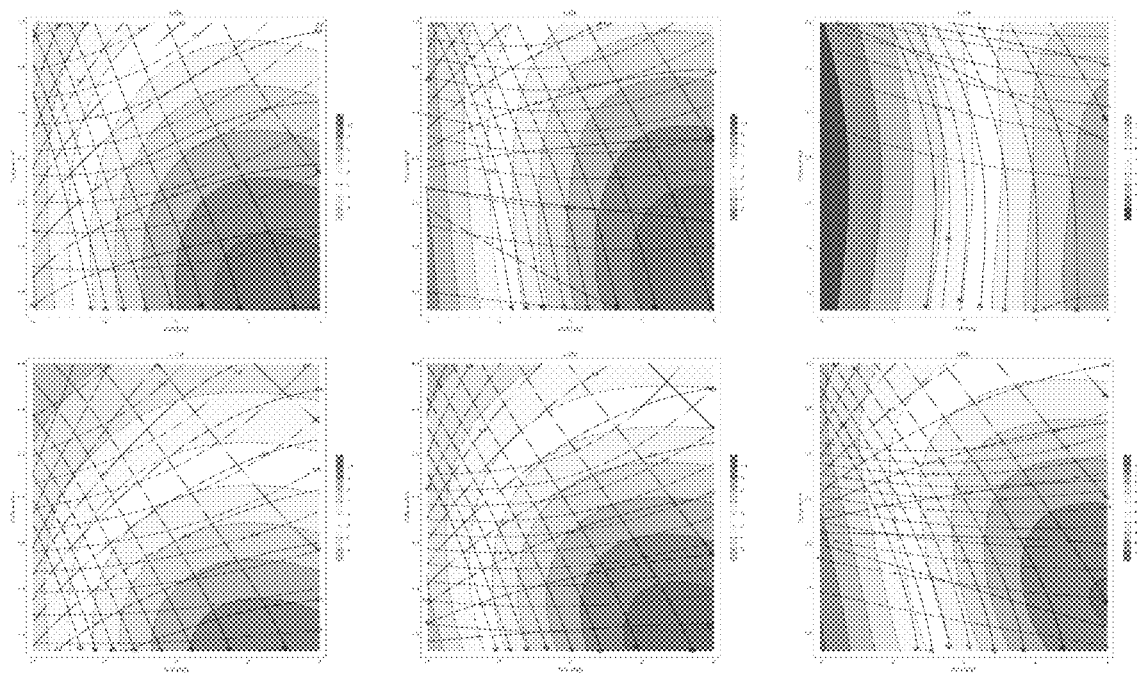

FIG. 6F illustrates a similar vehicle with the rotors at 20 degrees of forward tilt but with rotor blades with 5 degrees more pitch than the case of FIG. 6C. As seen, there are almost no areas of L/De of as high as 9 above the 2.0 speed ratio line, especially in the areas of level flight (0 degrees AOA).

Figure 7:
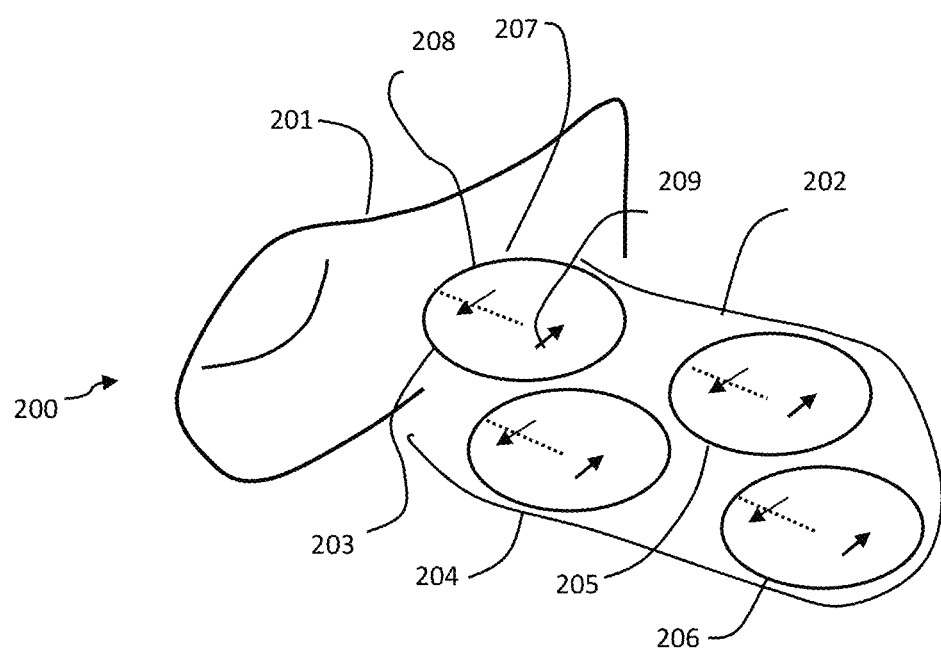
FIG. 7 is a view of an aerial vehicle with a synthetic wing using longitudinally staggered rotors according to some embodiments of the present invention.

In some embodiments of the present invention, as seen in FIG. 7, an aerial vehicle 200 with a left side synthetic wing 202 (right side synthetic wing not shown) has rotors staggered along the longitudinal axis. The inboard rotor 207 has a forward direction side of its propeller 208 and a returning side 209. The returning side 209 of the inboard rotor 207 significantly overlaps, along the span direction of the pseudo-wing 202, with the forward direction side of the next rotor 204. This is repeated with the succeeding rotors 205, 206. This significant overlap of adjacent rotors forward direction side and returning sides evens out the lift provided during forward flight, as the forward flight speed enhances the lift on forward travel portion of the propellers rotation.

Figure 8:
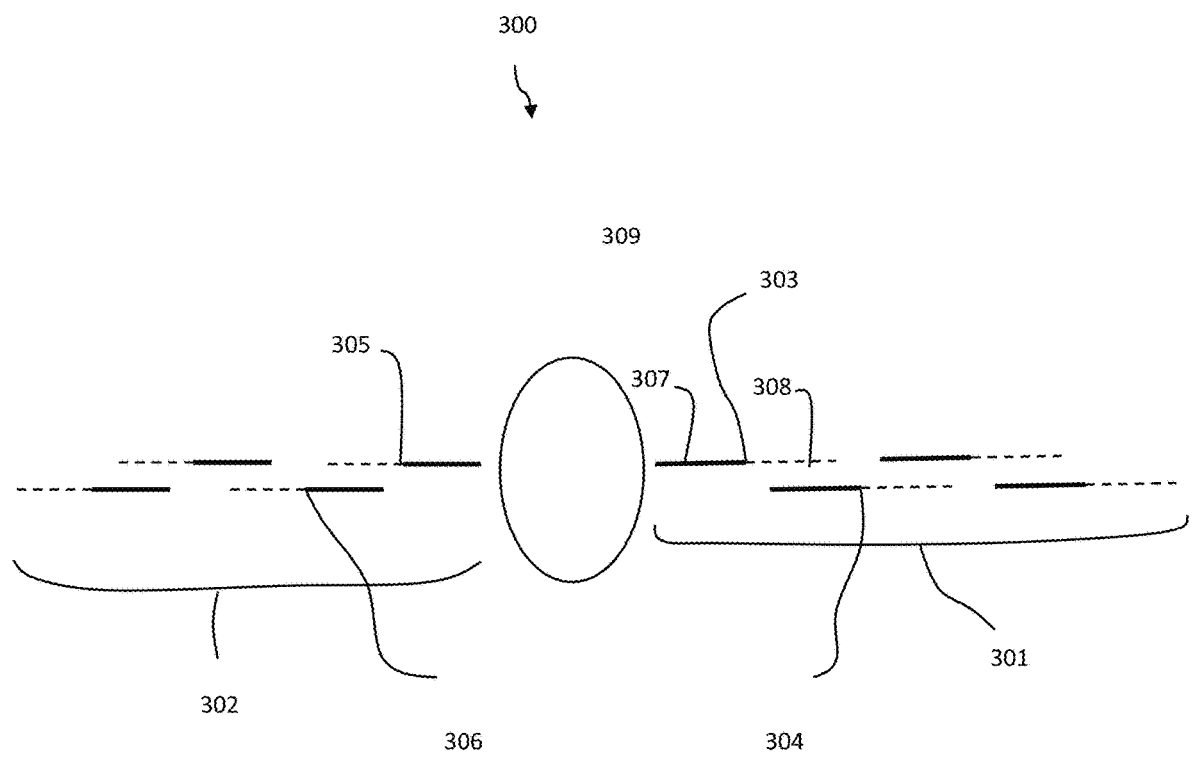
FIG. 8 is a view of an aerial vehicle with a synthetic wing using vertically staggered rotors according to some embodiments of the present invention.

In some embodiments of the present invention, as seen in FIG. 8, an aerial vehicle 300 with a left side synthetic wing 301 and a right side synthetic wing 302 has rotors staggered vertically along the span of the synthetic wing. The inboard rotor 303 has a forward direction side of its propeller 307 and a returning side 308. The returning side 308 of the inboard rotor 303 significantly overlaps, along the span direction of the synthetic wing 301, with the forward direction side of the next rotor 304. This is repeated with the succeeding rotors, and with the rotors of the other wing 305, 306. This significant overlap of adjacent rotors forward direction side and returning sides evens out the lift provided during forward flight, as the forward flight speed enhances the lift on forward travel portion of the propellers rotation.

Figure 9A:
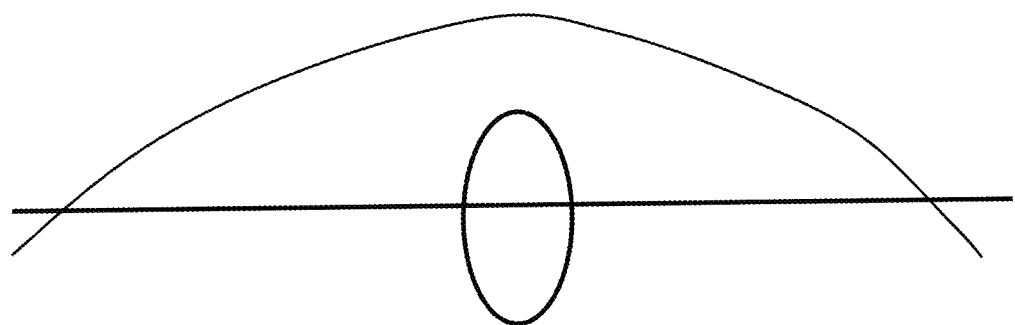
FIGS. 9A-E are sketches illustrating the evenness of lift for different vehicle configurations.

FIGS. 9A-E illustrate span-wise lift distribution for traditional and synthetic wings. FIG. 9A illustrates an hypothetical even span-wise lift distribution, as would be seen with a traditional wing. FIGS. 9B-E illustrate the lift distribution profiles of various types of synthetic wings, with each lift distribution profile contrasted against an elliptical ideal lift distribution (seen in dashed line). A rotor array configuration with a more even span-wise lift distribution will give a lower ratio of induced drag relative to an ideally loaded solid airfoil wing. An aspect of using a larger number of smaller rotors, as opposed to fewer larger rotors, is that there is less total blade area for a given length of span, and less drag. Generally, mean blade chord does not change with the number of rotors for a given total lift and tip speeds, so smaller rotors have a more favorable aspect ratio (radius to mean chord ratio).

Figure 9B:
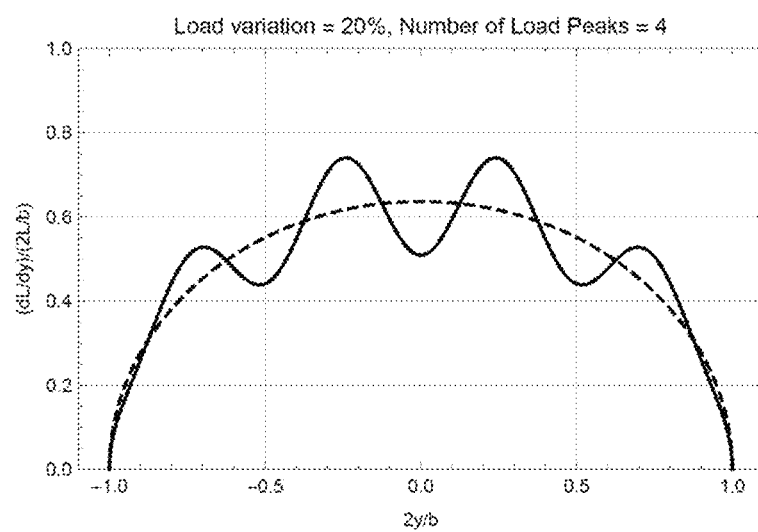
Figure 9C:
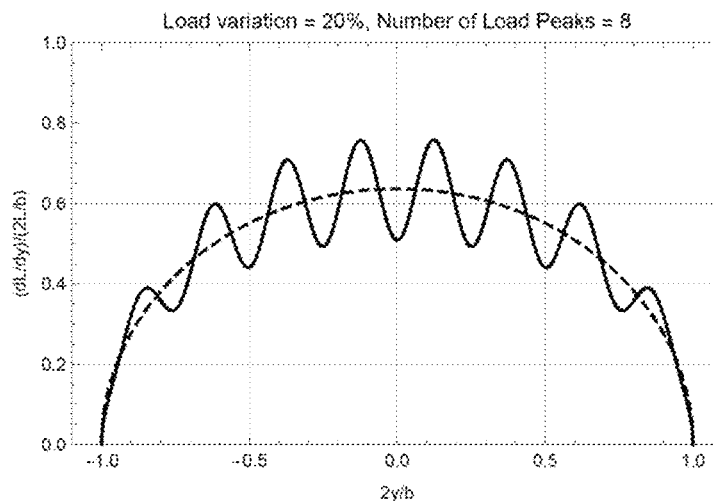

FIG. 9B illustrates a 4 rotor system (2 rotors per synthetic wing). The load variation is 20% due to the rotor configuration. The ratio of induced drag of this configuration to that of an ideally loaded wing is 1.22. FIG. 9C illustrates an 8 rotor system (4 rotors per synthetic wing). The load variation is 20% due to the rotor configuration. The ratio of induced drag of this configuration to that of an ideally loaded wing is 1.43.

Figure 9D:
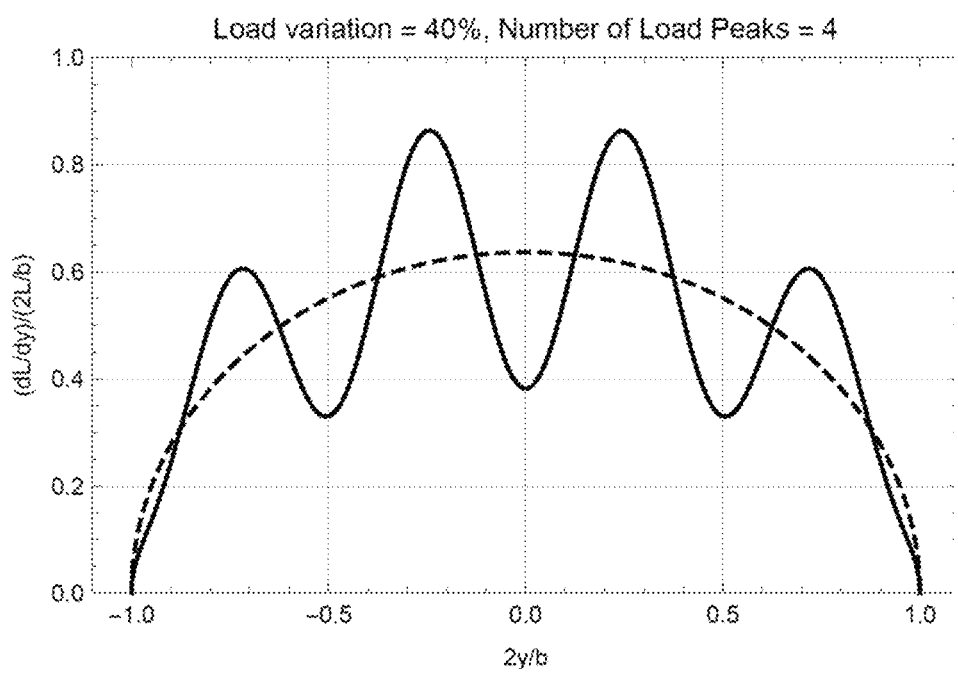
Figure 9E:
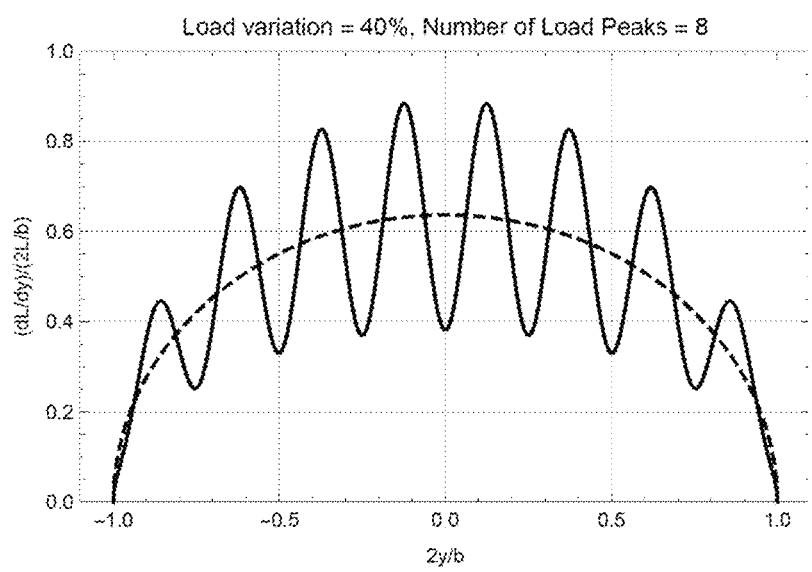

FIG. 9D illustrates a 4 rotor system (2 rotors per synthetic wing). The load variation is 40% due to the rotor configuration. The ratio of induced drag of this configuration to that of an ideally loaded wing is 1.88. FIG. 9E illustrates an 8 rotor system (4 rotors per synthetic wing). The load variation is 40% due to the rotor configuration. The ratio of induced drag of this configuration to that of an ideally loaded wing is 2.71.

FIGS. 10A-B illustrates a rotor 221 according to some embodiments of the present invention. As seen, there is significant radius of the rotor 221 at the inboard end of the rotor blades 221 (as dimensioned in Tables 1 and 2). In such a configuration, the inboard end of the rotor blade 220 is less susceptible to have its retreating blade stall as compared to a configuration where the blade routes further towards the spin axis. This center area of the rotor allows for placement of the individual motor within the outer surface of the rotor (or pair of motors in the counter-rotating blade configuration). Thus, the rotor blades may begin radially outboard (relative to the spin axis) of the motor itself. The rotor diameter may be larger than the outside diameter of the motor in some aspects.

In some embodiments, as seen in FIGS. 11A-D and 12A-B, an aerial vehicle 400 utilizes forward canted rotors in accord with other embodiments of the present invention. The aerial vehicle 400 has a vehicle body 441 with a left wing 447 and a right wing 446. As seen in top view in FIG. 11C, the left wing 447 has an inner section 447a and an outer section 447b. The right wing 446 has an inner section 446a and an outer section 446b. The wings 446, 447 may be partially forward swept wings with the inner sections 446a, 447a forward swept and the outer sections 446b, 447b sweeping rearward. The configuration of the wings 446, 447 as shown allows for the aerodynamic center of the wings to be rearward of the center of mass of the aerial vehicle, which may enhance the control and stability of the aerial vehicle in forward flight. Also, it may be desirable to have the wings coupled to the body of the aerial vehicle rearward of the location of the pilot. In some aspects, there are internal structural elements which couple the wings to the body, and to each other, which may traverse the inside of the body of the aerial vehicle. Also, these internal structural elements may be at the top of the aircraft body, as the wings may be structurally coupled to the aircraft body at or near the top of the aircraft body. With this higher elevation coupling and the associated internal structural supports, the wing may need to be coupled to the aircraft body rearward of the head of the pilot as the pilot sits in the aircraft body. The forward swept inner sections 446a, 447a allow for coupling of the wings rearward in support of the above mentioned considerations. Then, the change in the wing sweep on the outer sections 446b, 447b works to bring the overall longitudinal aerodynamic center of the wing rearward, in support of control and stability considerations. This wing configuration also supports a compact design, which is discussed further below.

The aerial vehicle 400 has a main body 441 coupled to a right side wing 446 and a left side wing 447, and has a plurality of wing mounted rotor assemblies. A right side forward inboard rotor assembly 448 and a right side rearward inboard rotor assembly 452 are mounted on a span support 463 which is coupled to the right side wing 446. A right side outboard rotor assembly 456 resides at the tip of the right side wing 446. The blades 457 of the right side outboard rotor assembly 456 provide lift in forward flight in area 461 outboard of the fixed wing 446, which widens the effective span of the wing. A left side forward inboard rotor assembly 450 and a left side rearward inboard rotor assembly 454 are mounted on a span support 462 which is coupled to the left side wing 447. A left side outboard rotor assembly 458 resides at the tip of the left side wing 447. The blades 459 of the left side outboard rotor assembly 458 provide lift in forward flight in area 460 outboard of the fixed wing 447, which widens the effective span of the wing.

Figure 11A:
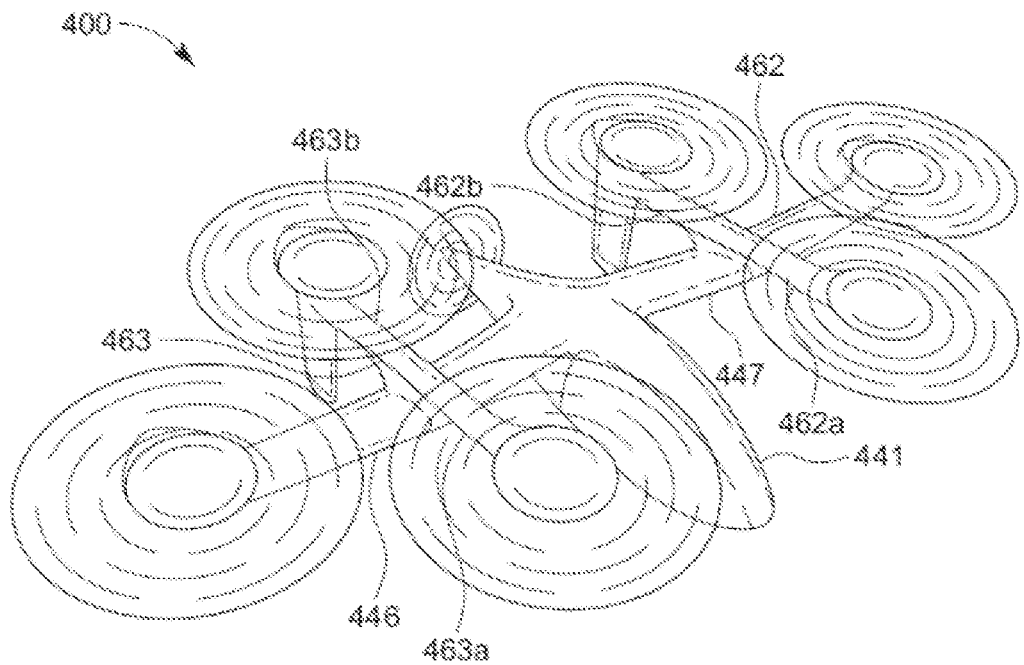
FIGS. 11A-D are views of an aerial vehicle with wing tip rotors according to some embodiments of the present invention.
Figure 11B:
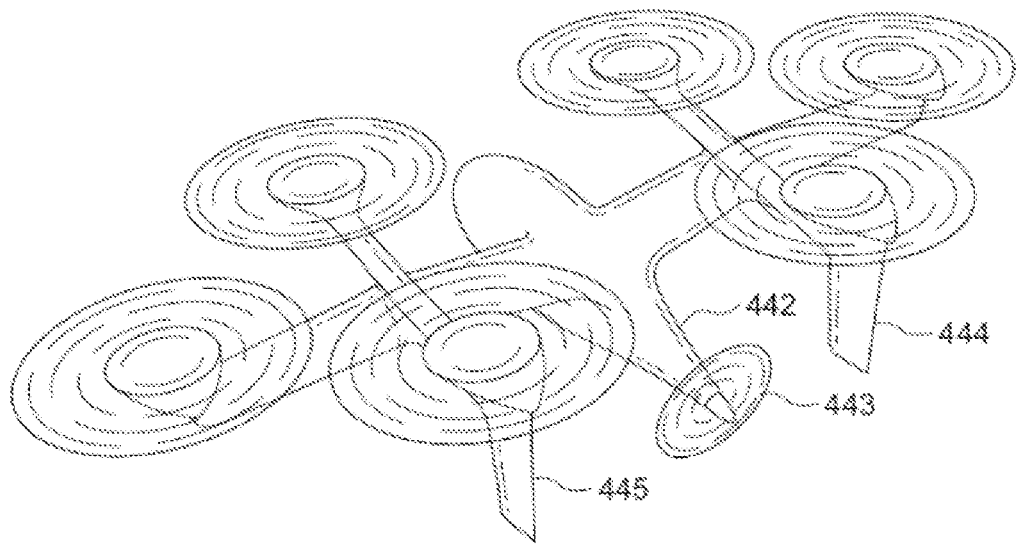
Figure 11C:
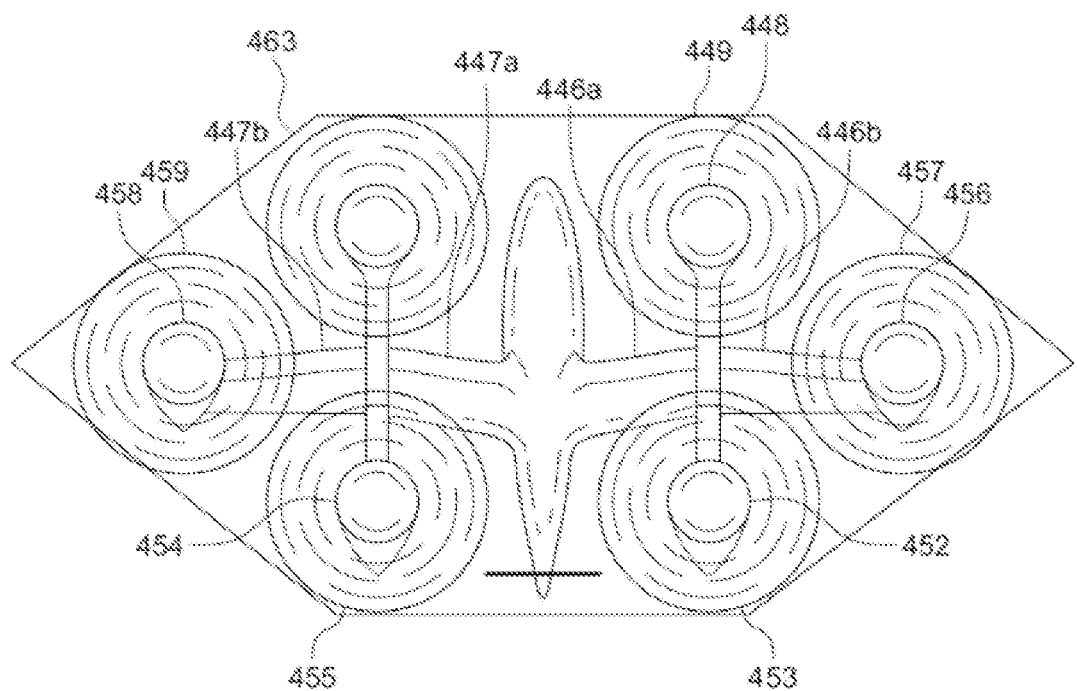
Figure 11D:
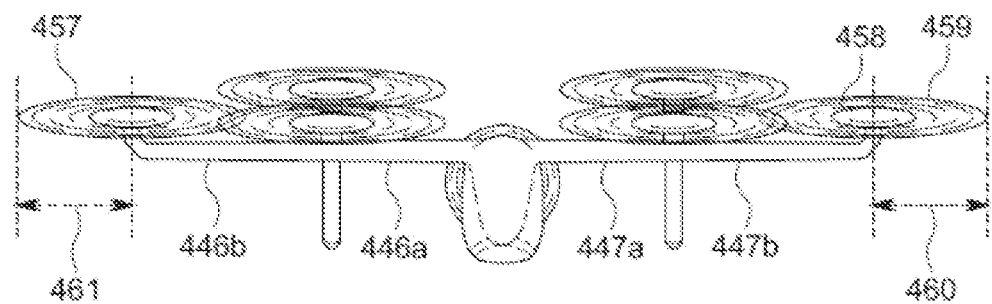

As seen in top view in FIG. 11C, the blade discs 449, 451, 453, 455, 457, 459 are seen to form a hexagon 463. The centers of the outboard rotors 456, 458 and their blade discs 457, 459 are seen somewhat forward of the leading edge of the rearward swept outer sections 446b, 447b of the wings 446, 447. The centers of the outboard rotors 456, 458 and their blade discs 457, 459 may be on or near the longitudinal center of mass of the aerial vehicle when loaded for flight. As seen, the hexagon 463 represents the external configuration limit of the aircraft, and this hexagon 463 represents a very compact design, which is almost fully occupied by either blade discs, wings, or the aircraft body. This helps increase the disc loading and hence hovering efficiency of the aircraft. It is also apparent that the wing configuration, as discussed above, contributes to the compactness of the design. In addition, it can be seen that each rotor has an opposite rotor on the other side of the aircraft body on a line substantially across the center of mass of the aircraft, and at or near the same distance from center of mass. This configuration allows for extremely quick control compensation in the case of a rotor failure during vertical take-off and landing operations, as the rotor opposite the failed motor can be nearly instantly powered down to help maintain attitude of the aircraft. In some aspects, the remaining four rotors may then be spun up to compensate for the overall loss of lift caused by the failure of one rotor and the depowering of the opposite rotor.

In some aspects, the wing rotor assemblies 448, 450, 452, 454, 456, 458 are not vertical relative to the constant altitude cruise plane of the aircraft, but are tilted forward at an angle. In some aspects, the rotors are tilted forward in the range of 5-20 degrees. In some aspects, the rotors are tilted forward in the range of 5-15 degrees. In some aspects, the rotors are tilted forward in the range of 8-20 degrees. In some aspects, the rotors are tilted forward in the range of 8-12 degrees. In an exemplary embodiment, the rotors are tilted at 10 degrees. The tilt angle may be defined as the angle between the rotor axis and the mean aerodynamic chord line of the wing. In some aspects, the wing rotor assemblies may be fixed at the above-mentioned tilt angles, and may not have any articulable aspects.

The aerial vehicle 400 has a horizontal thrusting rear rotor assembly 443 adapted to provide horizontal thrust during regular flight. Rear support structures 444, 445 extend down from the outboard rotor assemblies and the rearward portion of the span supports. These are also used as airfoils to provide stability in the yaw axis of the aircraft.

Figure 12A:
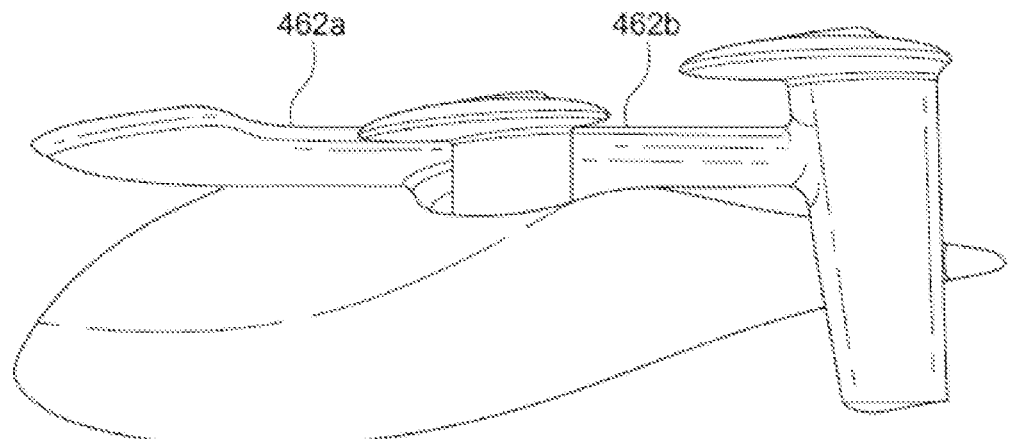
FIGS. 12A-B are side views of an aerial vehicle with wing tip rotors according to some embodiments of the present invention.
Figure 12B:
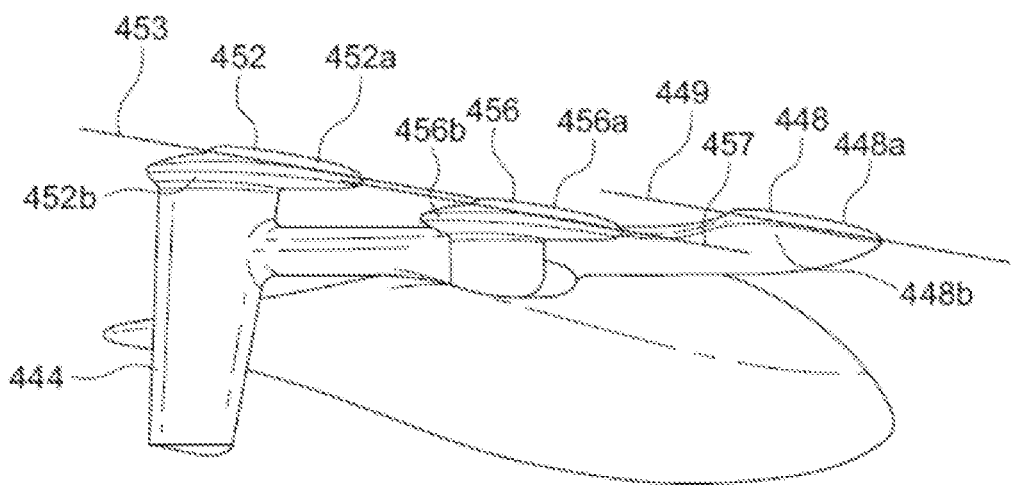

FIGS. 12A-B illustrate aspects of an aerial vehicle 400 according to some embodiments of the present invention. The inboard rotor assemblies are supported by span supports 462, 463, which can be viewed as having forward portions 462a, 463a and rear portions 462b, 463b, although the span supports themselves may be a continuous support. The span supports 462, 463 are coupled to the wings 446, 447. A front rotor assembly 448 may have a top cover 448a and a rear portion 448b adapted for aerodynamic drag minimization. Similarly, the outboard rotor assembly 456 may have a top cover 456a and a rear portion 456b, and the rear inboard rotor assembly 452 may have a top cover 452a and a rear portion 452b. The trailing aspect of the rear portions 448a, 456b, 452b are discussed further below. As seen in side view in FIG. 12B, the blade discs 449, 457, 453 are tilted forward relative to the horizontal aspect of the aircraft.

Among the design factors which have been considered in the aerial vehicle 440 are the configuration as used in vertical take-off and landing and the control that the configuration brings, the longitudinal station of the wing aerodynamic center of lift for control stability, a higher tip speed of the blades as needed for control vs. the desire to keep tip speed down to reduce drag, and the maintenance of relatively even lift along the wing span. The interplay of these factors does not lead to obvious optimization.

In some aspects with forward inboard rotor assembly and a rearward inboard rotor assembly and only a single outboard assembly on each wing, the lift provided by the individual inboard rotor assemblies during forward flight may be lower than that of the outboard rotor assembly such that their total lift provides a more even lift distribution along the wing.

In some aspects, the wing rotor assemblies have rotating propellers with electric motors. In some aspects, the horizontal thrusting rear rotor assembly has an electric motor. In some aspects, the motors are powered by an electric power source, such as a battery or plurality of batteries.

Figure 13A:
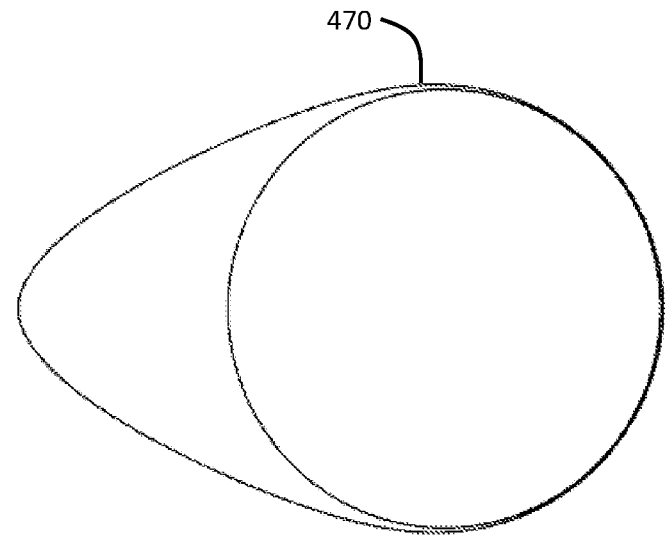
FIGS. 13A-C are views of a rotor cowling according to some embodiments of the present invention.
Figure 13B:
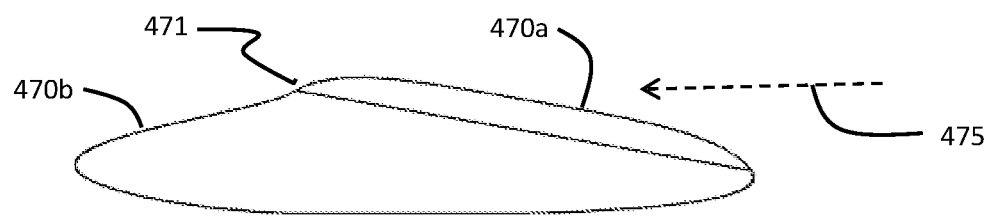
Figure 13C:

FIGS. 13A-C illustrate rotor assembly 470 with a top cover 470a and an extended rear portion under cowling 470b. As the rotor assembly will maintain a forward tilt from vertical of 10 degrees, for example, or another value as discussed above, the extended rear portion 470b facilitates a pressure recovery region to avoid flow separation. In some aspects, the extended rear portion undercowling may be a part of a continuous aerodynamic structure which couples with the exterior surface of the aerodynamic boom. In some aspects, the extended rear portion undercowling may be more distinct from adjacent structure, as seen in FIG. 13B. In a typical embodiment, the motor, which may be an electric motor, resides within the rotor assembly 470.

Figure 14A:
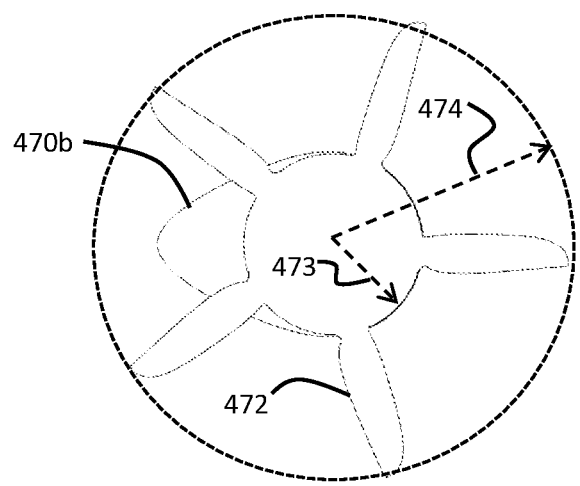
FIGS. 14A-C are views of a rotor with cowling and blades according to some embodiments of the present invention.
Figure 14B:
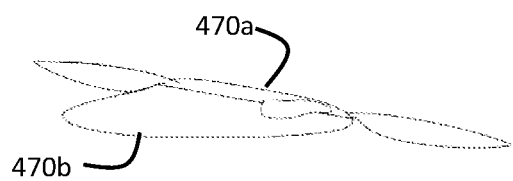
Figure 14C:
Figure 15A:
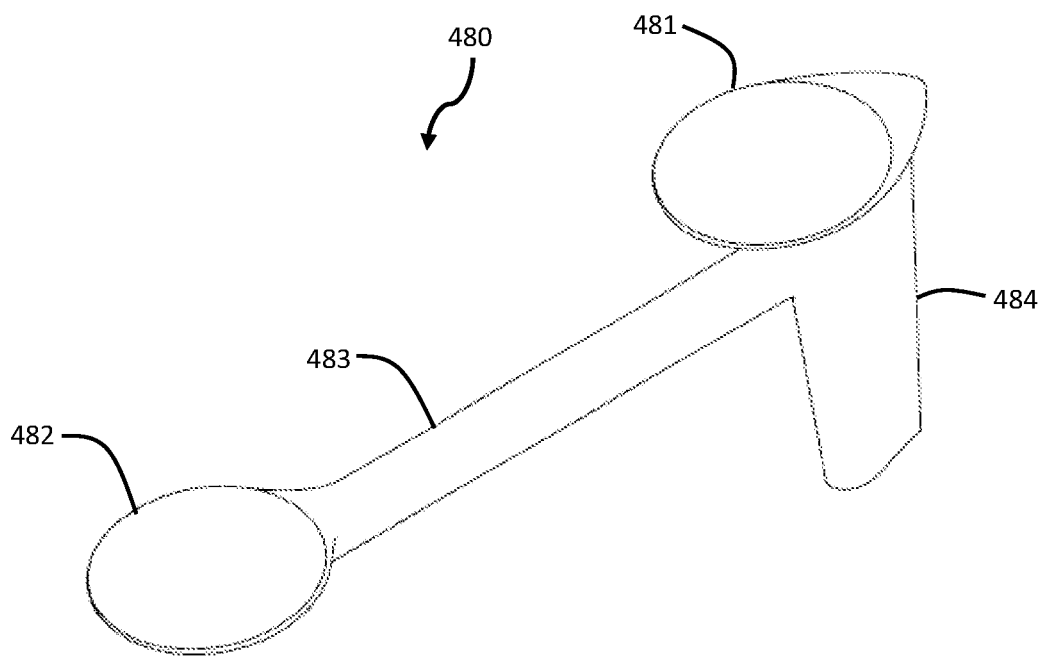
FIGS. 15A-E are views of a spar and rotors assembly according to some embodiments of the present invention.
Figure 15B:
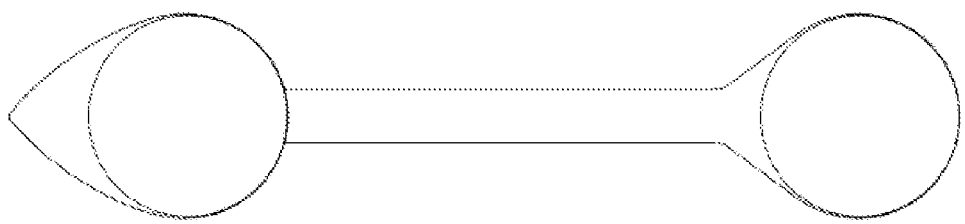
Figure 15C:
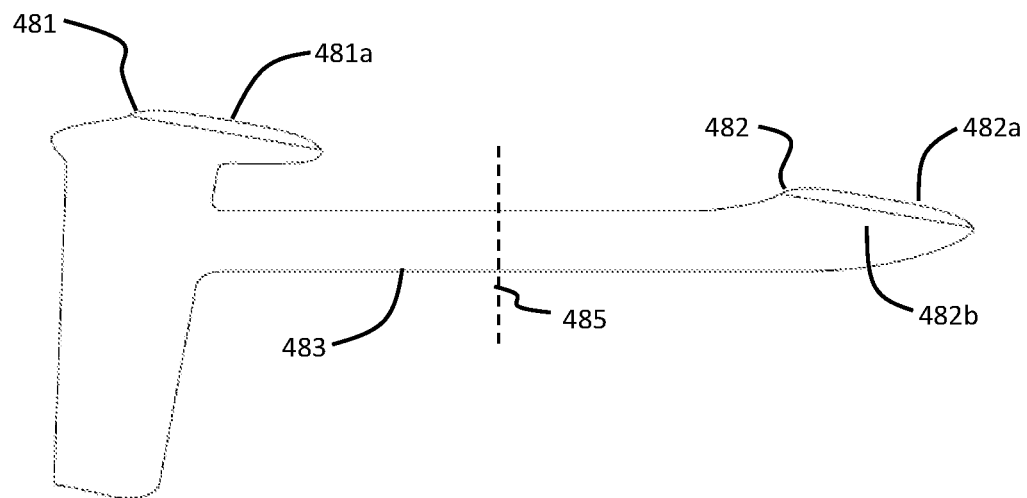
Figure 15D:
Figure 15E:
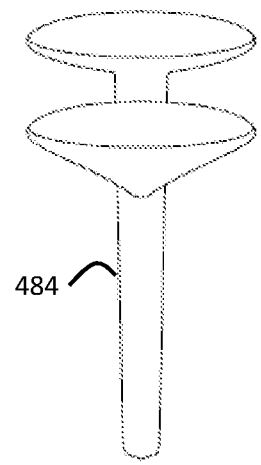

FIGS. 14A-C illustrates a rotor assembly 470 with blades 472. The top cover 470a will rotate with the blades while the extended rear portion 470b of the rotor assembly will remain fixed with the aircraft body. Another aspect of the rotor assembly 470 is the ratio of the radius 473 of the rotor top cover 470a to the radius 474 of the blade disc. As discussed above, a rotor cap 470a with a larger radius pushes out the inboard end of the blade 472, and reduces the circumstances where there may be stall on the retreating blades during forward flight. In some aspects, the ratio of the radius of the rotor cap to the radius of the blade disc is greater than 0.25. In some aspects, the ratio of the radius of the rotor cap to the radius of the blade disc is greater than 0.30. In some aspects, the ratio of the radius of the rotor cap to the radius of the blade disc is greater than 0.20.

FIGS. 15A-E illustrate an exemplary double rotor assembly 480 with an aerodynamic boom 483. A front rotor assembly 482 has a top cover 482a and an extended rear portion 482b. A rear rotor assembly 481 has a top cover 281a and an extended rear portion 481b. A rear support structure 484 may extend downward from the rear area of the aerodynamic boom 483. As seen in cross-section in FIG. 15C from a cut 485 made along the aerodynamic boom 483, a foil cross-section is used to reduce drag during vertical take-off and landing operations, as well as during forward flight.

In some embodiments, as seen in FIGS. 16A-D, an aerial vehicle 500 utilizes forward canted rotors in accord with other embodiments of the present invention. The aerial vehicle 500 has a vehicle body 501 with a left wing 502 and a right wing 503. As seen in top view in FIG. 16C, the left wing 502 has an inner section and an outer section. The right wing 503 has an inner section and an outer section. The wings 502, 503 may be partially forward swept wings with the inner sections forward swept and the outer sections sweeping rearward. The configuration of the wings as shown allows for the aerodynamic center of the wings to be rearward of the center of mass of the aerial vehicle, which may enhance the control and stability of the aerial vehicle in forward flight. Also, it may be desirable to have the wings coupled to the body of the aerial vehicle rearward of the location of the pilot. In some aspects, there are internal structural elements which couple the wings to the body, and to each other, which may traverse the inside of the body of the aerial vehicle. Also, these internal structural elements may be at the top of the aircraft body, as the wings may be structurally coupled to the aircraft body at or near the top of the aircraft body. With this higher elevation coupling and the associated internal structural supports, the wing may need to be coupled to the aircraft body rearward of the head of the pilot as the pilot sits in the aircraft body. The forward swept inner sections allow for coupling of the wings rearward in support of the above mentioned considerations. Then, the change in the wing sweep on the outer sections works to bring the overall longitudinal aerodynamic center of the wing rearward, in support of control and stability considerations. A horizontally thrusting propeller 516 is adapted to propel the aircraft forward in horizontal flight, in conjunction with the forward thrust component of the wing mounted rotor assemblies, as discussed above.

The aerial vehicle 500 has a main body 501 coupled to a right side wing 503 and a left side wing 502, and has a plurality of wing mounted stacked double rotor assemblies. A right side forward upper rotor assembly 506 and a right side forward lower rotor assembly 507, and a right side rearward upper rotor assembly 504 and right side rearward lower rotor assembly 505 are mounted on a span support which is coupled to the right side wing 503. A left side forward upper rotor assembly 508 and a left side forward lower rotor assembly 509, and a left side rearward upper rotor assembly 510 and a left side lower rotor assembly 511 are mounted on a span support which is coupled to the left side wing 502. In this configuration, it can be seen that each rotor has an opposite rotor on the other side of the aircraft body on a line substantially across the center of mass of the aircraft, and at or near the same distance from center of mass. This configuration allows for extremely quick control compensation in the case of a rotor failure during vertical take-off and landing operations, as the rotor opposite the failed motor can be nearly instantly powered down to help maintain attitude of the aircraft. In some aspects, the remaining four rotors may then be spun up to compensate for the overall loss of lift caused by the failure of one rotor and the depowering of the opposite rotor.

In some aspects, the wing rotor assemblies 504, 505, 506, 507, 508, 509, 510, 511 are not vertical relative to the constant altitude cruise plane of the aircraft, but are tilted forward at an angle. In some aspects, the rotors are tilted forward in the range of 5-20 degrees. In some aspects, the rotors are tilted forward in the range of 5-15 degrees. In some aspects, the rotors are tilted forward in the range of 8-20 degrees. In some aspects, the rotors are tilted forward in the range of 8-12 degrees. In an exemplary embodiment, the rotors are tilted at 10 degrees. The tilt angle may be defined as the angle between the rotor axis and the mean aerodynamic chord line of the wing. In some aspects, the wing rotor assemblies may be fixed at the above-mentioned tilt angles, and may not have any articulable aspects.

Figure 16A:
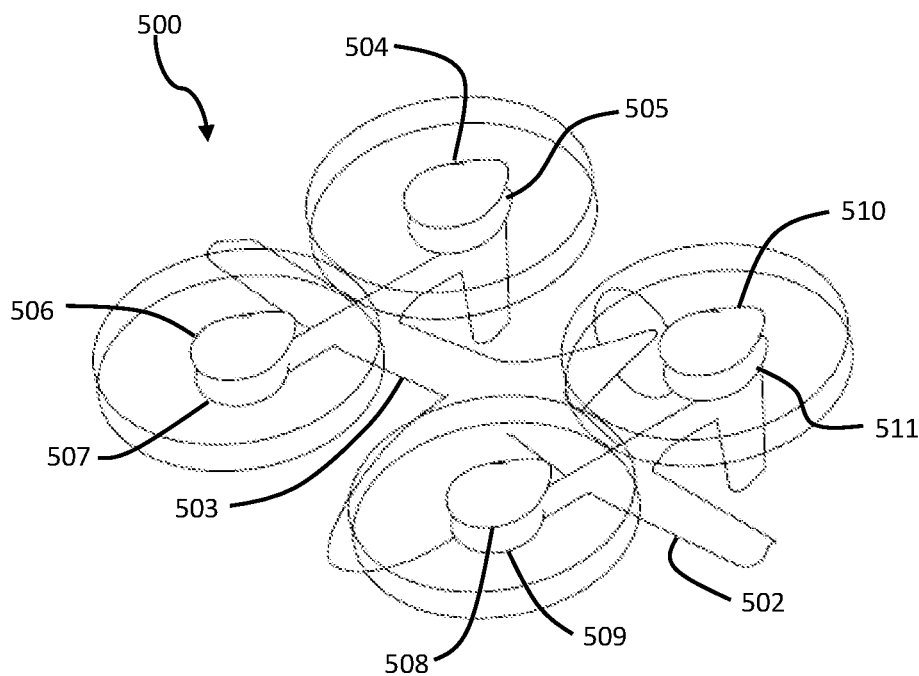
FIGS. 16A-D are views of an aerial vehicle with stacked rotors according to some embodiments of the present invention.
Figure 16B:
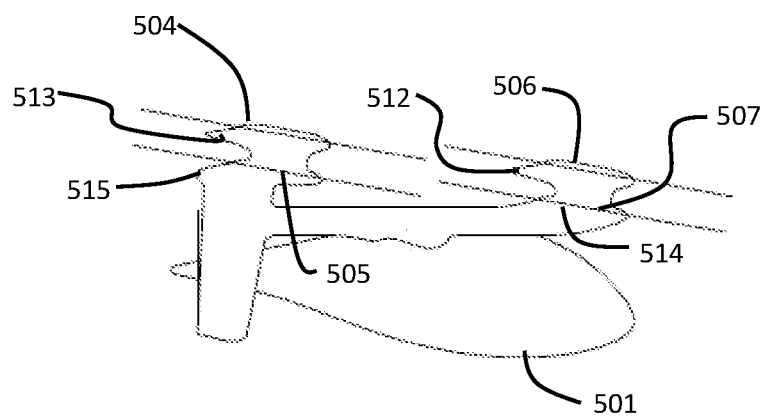
Figure 16C:
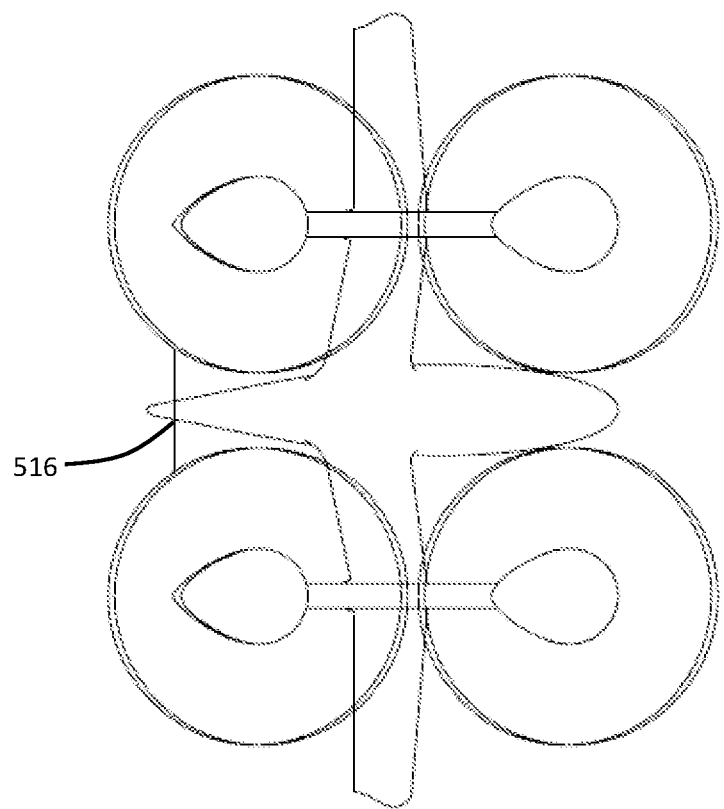
Figure 16D:
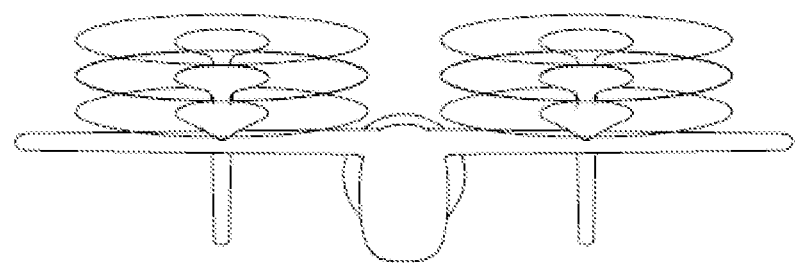

As illustrate in side view in FIG. 16B, the rotor assemblies 504, 505, 506, 507 are supported by rotors with extended rear portion 512, 513, 514, 516 which facilitate a pressure recovery region to avoid flow separation.

In some embodiments, as seen in FIGS. 17A-D, an aerial vehicle 600 utilizes forward canted rotors in accord with other embodiments of the present invention. The aerial vehicle 600 has a vehicle with a left wing and a right wing. As seen in top view in FIG. 17C, the left wing has an inner section and an outer section. The right wing 503 has an inner section and an outer section. The wings may be partially forward swept wings with the inner sections forward swept and the outer sections sweeping rearward. The configuration of the wings as shown allows for the aerodynamic center of the wings to be rearward of the center of mass of the aerial vehicle, which may enhance the control and stability of the aerial vehicle in forward flight. Also, it may be desirable to have the wings coupled to the body of the aerial vehicle rearward of the location of the pilot. In some aspects, there are internal structural elements which couple the wings to the body, and to each other, which may traverse the inside of the body of the aerial vehicle. Also, these internal structural elements may be at the top of the aircraft body, as the wings may be structurally coupled to the aircraft body at or near the top of the aircraft body. With this higher elevation coupling and the associated internal structural supports, the wing may need to be coupled to the aircraft body rearward of the head of the pilot as the pilot sits in the aircraft body. The forward swept inner sections allow for coupling of the wings rearward in support of the above mentioned considerations. Then, the change in the wing sweep on the outer sections works to bring the overall longitudinal aerodynamic center of the wing rearward, in support of control and stability considerations. A horizontally thrusting propeller 516 is adapted to propel the aircraft forward in horizontal flight, in conjunction with the forward thrust component of the wing mounted rotor assemblies, as discussed above.

The aerial vehicle 600 has a main body coupled to a right side wing and a left side wing, and has a plurality of wing mounted rotor assemblies. An inboard right side forward rotor assembly 605 and an inboard right side rearward rotor assembly 606 are mounted on a span support which is coupled to the right side wing, An outboard right side forward rotor assembly 607 and an outboard right side rearward rotor assembly 608 are mounted on a span support which is coupled to the right side wing. An inboard left side forward rotor assembly 603 and an inboard left side rearward rotor assembly 604 are mounted on a span support which is coupled to the left side wing 503 A left side outboard rotor assembly 601 and a left side outboard rearward rotor assembly 602 are mounted on a span support which is coupled to the left side wing. The blades of the left side outboard rotor assemblies 601, 602 provide lift in forward flight in area 610 outboard of the fixed wing, which widens the effective span of the wing. The blades of the right side outboard rotor assemblies 607, 608 provide lift in forward flight in area 611 outboard of the fixed wing, which widens the effective span of the wing.

In this configuration, it can be seen that each rotor has an opposite rotor on the other side of the aircraft body on a line substantially across the center of mass of the aircraft, and at or near the same distance from center of mass. This configuration allows for extremely quick control compensation in the case of a rotor failure during vertical take-off and landing operations, as the rotor opposite the failed motor can be nearly instantly powered down to help maintain attitude of the aircraft. In some aspects, the remaining four rotors may then be spun up to compensate for the overall loss of lift caused by the failure of one rotor and the depowering of the opposite rotor.

In some aspects, the wing rotor assemblies 601, 602, 603, 604, 605, 606, 607, 608 are not vertical relative to the constant altitude cruise plane of the aircraft, but are tilted forward at an angle. In some aspects, the rotors are tilted forward in the range of 5-20 degrees. In some aspects, the rotors are tilted forward in the range of 5-15 degrees. In some aspects, the rotors are tilted forward in the range of 8-20 degrees. In some aspects, the rotors are tilted forward in the range of 8-12 degrees. In an exemplary embodiment, the rotors are tilted at 10 degrees. The tilt angle may be defined as the angle between the rotor axis and the mean aerodynamic chord line of the wing. In some aspects, the wing rotor assemblies may be fixed at the above-mentioned tilt angles, and may not have any articulable aspects.

Figure 17A:
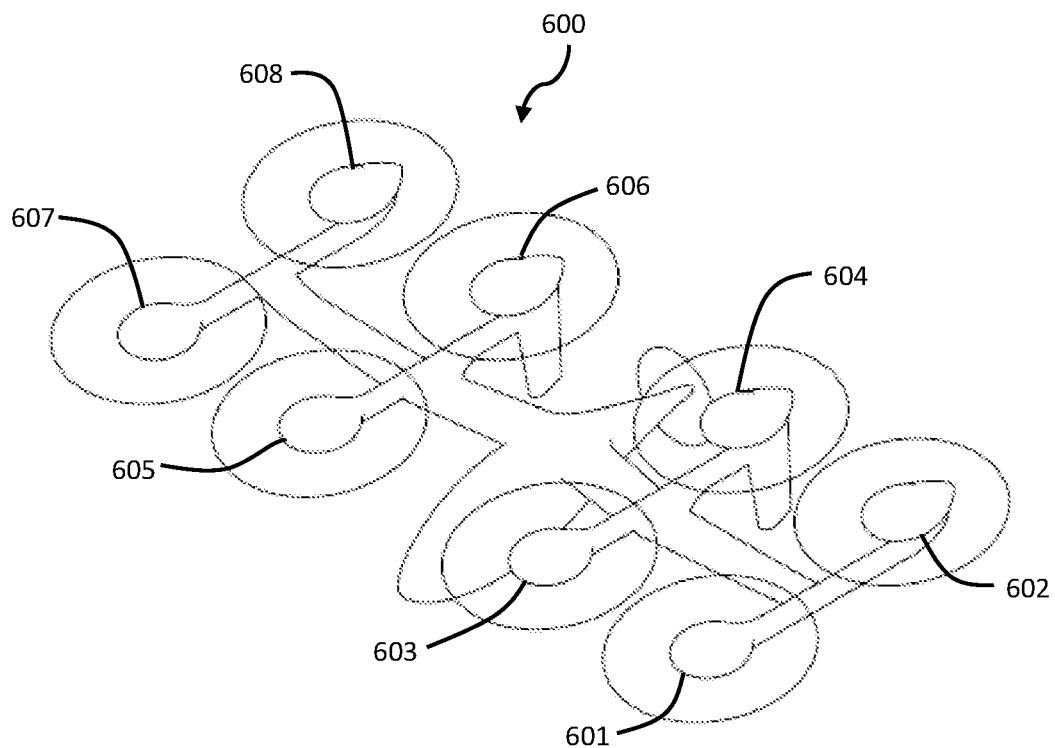
FIGS. 17A-D are views of an aerial vehicle with fore and aft wing tip rotors according to some embodiments of the present invention.
Figure 17B:
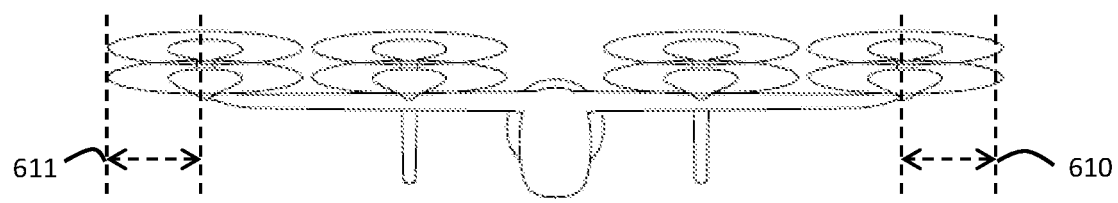
Figure 17C:
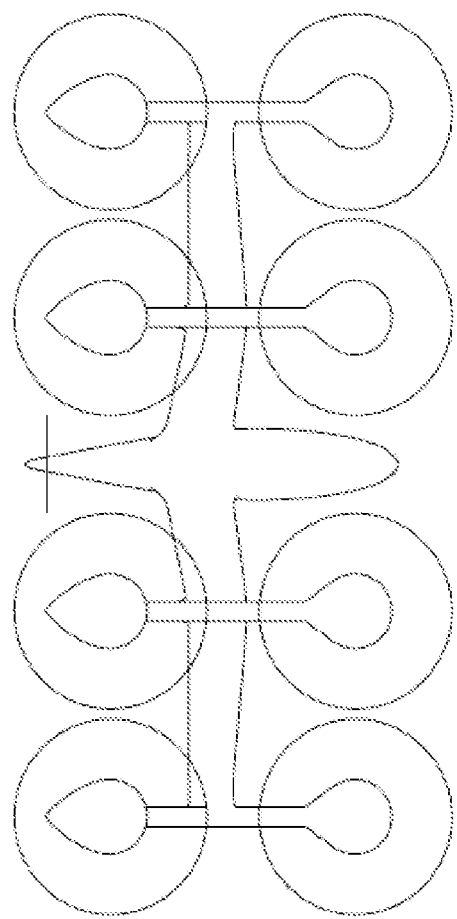
Figure 17D:
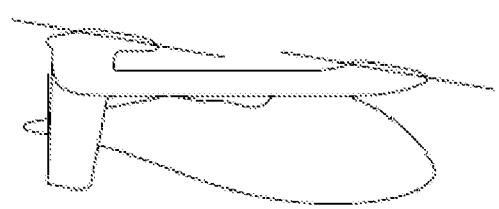

As illustrate in side view in FIG. 17D, the rotor assemblies 601, 602, 603, 604, 605, 606, 607, 608 are supported by rotors with extended rear portion which facilitate a pressure recovery region to avoid flow separation.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A method for flying of a vertical take-off and landing aircraft with fixed forward tilted rotors, said method comprising the steps of:

powering up a plurality of right side wing rotor assemblies of a vertical take-off and landing aircraft wherein the spin axis of each of said right side wing rotor assemblies is tilted forward at a fixed angle to the normal of the horizontal flight line of the aerial vehicle in nominal forward flight and a plurality of left side wing rotor assemblies of said vertical take-off and landing aircraft wherein the spin axis of each of said left side wing rotor assemblies is tilted forward at a fixed angle to the normal of the horizontal flight line of the aerial vehicle in nominal forward flight, said vertical take-off and landing aircraft comprising a right side wing and a left side wing, said right side wing and said left side wing fixedly coupled to an aircraft main fuselage, and wherein said right side wing rotor assemblies and said left side wing rotor assemblies are fixedly coupled to said right side wing and said left side wing, respectively;

lifting off the aerial vehicle into a pitched up vertical take-off and landing configuration, thereby producing predominantly vertical thrust from said plurality of right side wing rotor assemblies and said plurality of left side wing rotor assemblies;

gaining altitude using said vertical thrust;

pitching the aerial vehicle forward in order to gain a forward thrust component from said forward tilted plurality of right side wing rotor assemblies and plurality of left side wing rotor assemblies;

increasing power to a horizontally thrusting rotor, thereby increasing the forward speed of the aerial vehicle and increasing the amount lift provided by the wings of said aerial vehicle; and flying in a forward flight mode by decreasing the power to said plurality of right side wing rotor assemblies and said plurality of left side wing rotor assemblies such that the ratio of lift provided by said forward tilted plurality of right side wing rotor assemblies and plurality of left side wing rotor assemblies to that of the wings is greater than 0.2, wherein the spin axis of each of said right side wing rotor assemblies and each of said left side wing rotor assemblies is tilted forward at a fixed angle to the normal of the horizontal flight line of the aerial vehicle in nominal forward flight in the range of 5-20 degrees.

2. The method of claim 1 wherein the ratio of lift provided by said forward tilted plurality of right side wing rotor assemblies and plurality of left side wing rotor assemblies to that of the wings is greater than 0.25.

3. The method of claim 2 further comprising engaging in maneuvers of the aerial vehicle by differentiating the thrust and torque provided by different wing rotor assemblies.

4. The method of claim 2 further comprising engaging in maneuvers of the aerial vehicle solely by differentiating the thrust and torque provided by different wing rotor assemblies.

5. The method of claim 2 wherein the spin axis of each of said right side wing rotor assemblies and each of said left side rotor assemblies is tilted forward at a fixed angle to the normal of the horizontal flight line of the aerial vehicle in nominal forward flight in the range of 5-15 degrees.

6. The method of claim 2 wherein the spin axis of each of said right side wing rotor assemblies and each of said left side rotor assemblies is tilted forward at a fixed angle to the normal of the horizontal flight line of the aerial vehicle in nominal forward flight in the range of 8-12 degrees.

7. The method of claim 1 further comprising engaging in maneuvers of the aerial vehicle by differentiating the thrust provided by different wing rotor assemblies.

8. The method of claim 1 further comprising engaging in maneuvers of the aerial vehicle solely by differentiating the thrust and torque provided by different wing rotor assemblies.

9. The method of claim 1 wherein the spin axis of each of said right side wing rotor assemblies and each of said left side rotor assemblies is tilted forward at a fixed angle to the normal of the horizontal flight line of the aerial vehicle in nominal forward flight in the range of 5-15 degrees.

10. The method of claim 1 wherein the spin axis of each of said right side wing rotor assemblies and each of said left side rotor assemblies is tilted forward at a fixed angle to the normal of the horizontal flight line of the aerial vehicle in nominal forward flight in the range of 8-12 degrees.

* * * * *